United States Patent
Wang et al.

(10) Patent No.: US 10,114,680 B2
(45) Date of Patent: Oct. 30, 2018

(54) METHOD AND APPARATUS FOR THE VIRTUALIZATION OF RESOURCES USING A VIRTUALIZATION BROKER AND CONTEXT INFORMATION

(71) Applicant: CONVIDA WIRELESS, LLC, Wilmington, DE (US)

(72) Inventors: Chonggang Wang, Princeton, NJ (US); Dale N. Seed, Allentown, PA (US); Lijun Dong, San Diego, CA (US)

(73) Assignee: Convida Wireless, LLC, Wilmington, DE (US)

( * ) Notice: Subject to any disclaimer, the term of this patent is extended or adjusted under 35 U.S.C. 154(b) by 217 days.

(21) Appl. No.: 14/889,186

(22) PCT Filed: May 8, 2014

(86) PCT No.: PCT/US2014/037303
§ 371 (c)(1),
(2) Date: Nov. 5, 2015

(87) PCT Pub. No.: WO2014/182900
PCT Pub. Date: Nov. 13, 2014

(65) Prior Publication Data
US 2016/0085594 A1 Mar. 24, 2016

Related U.S. Application Data

(60) Provisional application No. 61/820,966, filed on May 8, 2013.

(51) Int. Cl.
*H04L 29/08* (2006.01)
*H04L 12/911* (2013.01)
(Continued)

(52) U.S. Cl.
CPC ........ *G06F 9/5077* (2013.01); *G06F 9/45558* (2013.01); *H04L 47/827* (2013.01);
(Continued)

(58) Field of Classification Search
None
See application file for complete search history.

(56) References Cited

U.S. PATENT DOCUMENTS

2010/0042720 A1* 2/2010 Stienhans ............. G06F 9/5072
709/226
2010/0332262 A1* 12/2010 Horvitz ................. G06F 9/5027
705/4
(Continued)

FOREIGN PATENT DOCUMENTS

CN 101410803 A 4/2009
CN 102479099 A 5/2012
(Continued)

OTHER PUBLICATIONS

Cloud Computing, Wikipedia https://en.wikipedia.org/w/index.php?title=Cloud_computing&oldid=693544918.
(Continued)

*Primary Examiner* — Philip Chea
*Assistant Examiner* — Hassan Khan
(74) *Attorney, Agent, or Firm* — Baker & Hostetler, LLP

(57) ABSTRACT

A method and entities for virtualizing resources by receiving a first virtualization request from a first entity at a virtualization broker in a network of connected entities, wherein the first virtualization request comprises context information associated with the first entity, transmitting a request from the virtualization broker to a virtualization manager for a virtualization server identifier, and receiving a virtualization server identifier from the virtualization manager. A second virtualization request may be transmitted to a virtualization
(Continued)

server associated with the virtualization server identifier, and a first response may be received from the virtualization server comprising an indication that a resource has been virtualized. A second response comprising the indication from the virtualization broker may be transmitted to the first entity. The method is applied in the context of the Internet of Things (IoT).

20 Claims, 15 Drawing Sheets

(51) Int. Cl.
  *G06F 9/50* (2006.01)
  *G06F 9/455* (2018.01)
  *H04W 4/70* (2018.01)
(52) U.S. Cl.
  CPC .............. *H04L 67/10* (2013.01); *H04L 67/12* (2013.01); *H04L 67/16* (2013.01); *H04L 67/18* (2013.01); *H04W 4/70* (2018.02); *G06F 2009/45595* (2013.01); *H04L 67/148* (2013.01); *Y02D 10/22* (2018.01); *Y02D 10/36* (2018.01)

(56) References Cited

U.S. PATENT DOCUMENTS

| | | | | |
|---|---|---|---|---|
| 2011/0016214 | A1* | 1/2011 | Jackson | G06F 9/5044 709/226 |
| 2012/0072910 | A1* | 3/2012 | Martin | G06F 9/45533 718/1 |
| 2012/0179817 | A1* | 7/2012 | Bade | G06F 8/61 709/225 |
| 2013/0060945 | A1* | 3/2013 | Allam | G06F 9/5072 709/226 |
| 2013/0067090 | A1* | 3/2013 | Batrouni | H04L 67/1097 709/226 |
| 2016/0065417 | A1* | 3/2016 | Sapuram | G06Q 30/0631 709/223 |
| 2016/0088049 | A1* | 3/2016 | Seed | H04W 4/70 709/203 |
| 2016/0119434 | A1* | 4/2016 | Dong | H04W 4/70 709/220 |

FOREIGN PATENT DOCUMENTS

| | | |
|---|---|---|
| GB | 2 477 092 | 7/2011 |
| WO | WO 2011-008219 | 1/2011 |

OTHER PUBLICATIONS

Butler Project, "uBiquitous, secUre inTernet-of-things with Location and contExt-awaReness", http://cordis.europa.eu/project/rcn/101349_en.html, Oct. 2011-2014, 5 pages.
ETSI "Machine-to-Machine communications (M2M); Functional Architecture", TS 102 690 V1.1.1, Oct. 2011, 280 pages.
"Internet of Things—Architecture—IOT-A: Internet of Things Architecture", Internet of Things Architecture © 2009, http://www.iot-a.eu/public, 3 pages.
Islam et al, "A Survey on Virtualization of Wireless Sensor Networks", Sensors, 2012, 12, 2175-2207.
Lasserre et al, "Framework for DC Network Virtualization draft-ietf-nvo3-framework-02.txt", Internet Engineering Task Force, Feb. 4, 2013, 25 pages.
Lee et al, "The Internet of Things—Concept and Problem Statement draft-lee-iot-problem-statement-04.txt", Internet Research Task Force, Mar. 12, 2012, 18 pages.
International Application No. PCT/US2014/037303: International Search Report and the Written Opinion dated Aug. 13, 2014.
Foued Jrad et al, "A Broker-Based Framework for Multi-Cloud Workflows", Proceedings of the 2013 International Workshop on Multi-Cloud Applications and Federated Clouds, Apr. 22, 2013, 61-68.
Jrad et al, "11 SLA based service brokering in intercloud environments",. Proceedings of the 2nd International Conference on Cloud Computing and Services Science, 2012, 76-81.
IRTF "Software-Defined Networking Research Group (SDNRG)", 2013, 3 pages, https://irtf.org/sdnrg.
Chowdhury, N.M. and Boutaba, R., "A Survey of Network Virtualization", Computer Networks, 54, 2010, 862-876.
Chowdhury, N.M. and Boutaba, R., "Network Virtualization: State of the Art and Research Challenges", IEEE Communications Magazine, Jul. 2009, 20-26.
Open Networking Foundation (ONF), OpenFlow Switch Specification Version 1.1.0 Implemented (Wire Protocol 0x02), Feb. 28, 2011, http://www.openflopw.org/documents/openflow-spec-v1.1.0.pdf.
iCore Project, http://www.iot-icore.eu/about-icore/project-impact, 1 page.
Sundmaeker et al, "Vision and Challenges for Realising the Internet of Things", CERP-IoT, Cluster of European Research Projects on the Internet of Things, Mar. 2010, 230 pages.
Yong et al, "Use Cases for DC Network Virtualization Overlays", draft-mity-nvo3-use-case-04, Network working group, Oct. 22, 2012, 17 pages.
3rd Generation Partnership Project; (3GPP) TS 23.251 V11.5.0, 3rd Generation Partnership Project; Technical Specification Group Services and System Aspects; Network Sharing; Architecture and functional description (Release 11), Mar. 2013, 34 pages.

* cited by examiner

METHOD AND APPARATUS FOR THE VIRTUALIZATION OF RESOURCES USING A VIRTUALIZATION BROKER AND CONTEXT INFORMATION

CROSS-REFERENCE TO RELATED APPLICATIONS

This application is a National Stage Application filed under 35 U.S.C. 371 of International Application No. PCT/US2014/037303, filed May 8, 2014, which claims the benefit of U.S. Provisional Patent Application No. 61/820,966, filed on May 8, 2013, entitled "METHOD AND APPARATUS FOR IOT VIRTUALIZATION SERVICES", the contents of which are hereby incorporated by reference herein.

BACKGROUND

Machine-to-machine (M2M) technologies allow devices to communicate more directly with each other using wired and wireless communications systems. M2M technologies enable further realization of the Internet of Things (IoT), a system of uniquely identifiable objects and virtual representations of such objects that communicate with each other and over a network, such as the Internet. IoT may facilitate communication with even mundane everyday objects, such as products in a grocery store or appliances in a home, and thereby reduce costs and waste by improving knowledge of such objects. For example, stores may maintain very precise inventory data by being able to communicate with, or obtain data from, objects that may be in inventory or may have been sold.

The IoT includes a variety of physical entities or "things", such as objects, devices, gateways, routers, servers, users, and applications. Each IoT entity may have various physical resources on different protocol layers that can be virtualized. A protocol (e.g., a media access control (MAC) protocol or routing protocol) can be one of several physical resources associated with protocols that a physical entity can dynamically support through virtualization. A physical IoT entity itself can also be a resource. A deployed IoT system or a physical IoT entity can support different applications at different times or at the same time based on its configuration and requirements. For example, a large-scale outdoor wireless heterogeneous sensor network deployed in a city can support an air quality monitoring application, a traffic monitoring application, a public safety management application, etc. In another example, a physical IoT gateway installed at a home can support several applications such as a remote healthcare application, a house monitoring application, and a smart appliance application. As a result, virtualization may be used to support sharing of such resources among multiple applications and/or users.

The access to resources by IoT entities is essential to successful operation of the IoT. Physical and software resources that may be needed by various IoT entities may be represented in a such a way that IoT entities can interact with such resources through interfaces to the resources without having to have knowledge of the resources' underlying physical and/or software implementations. In the IoT this may be referred to as resource "virtualization", and the resources used may be provided as a service to requesting IoT entities through the use of, for example, logical interfaces. Examples of virtualized resources may include infrastructure as a service (IaaS) where cloud providers provide a cloud infrastructure as a physical or a virtual machines to users, platform as a service (PaaS) where cloud providers provide a cloud computing platform (e.g., an operating system, a programming language execution environment, a database, and a web server), software as a service (SaaS) where cloud providers run software in the cloud, receiving input for the software from users and providing the software's output to users, and other virtualization-enabled services, such as storage as a service, data as a service, etc.

Existing virtualization techniques, however, are not service-layer common functionalities and not specifically defined for IoT systems. Service-layer virtualization functionalities are underdeveloped in existing M2M/IoT architectures and service capabilities as defined in ETSI TC M2M, TS 102 690 (Architecture), the Europe IoT-A Project, the Europe iCore Project, and the Europe Butler Project. What is needed in the art are systems and methods that include new service-layer virtualization functionalities as a common service and that can support the integration of efficient and flexible IoT resource virtualization.

SUMMARY

Embodiments disclosed herein include methods for virtualizing resources by receiving a first virtualization request from a first entity at a virtualization broker in a network of connected entities, wherein the first virtualization request comprises context information associated with the first entity, transmitting a request from the virtualization broker to a virtualization manager for a virtualization server identifier, and receiving a virtualization server identifier from the virtualization manager. A second virtualization request may be transmitted to a virtualization server associated with the virtualization server identifier, and a first response may be received from the virtualization server comprising an indication that a resource has been virtualized. A second response comprising the indication from the virtualization broker may be transmitted to the first entity.

Embodiments disclosed herein further include a virtualization manager in a network of connected entities comprising that, when executing stored instructions, effectuates operations including receiving a request to register resources associated with a virtualization server, storing context information associated with the virtualization server and the resources, pushing virtualization policies to a virtualization server, maintaining a lookup history from a virtualization client or a virtualization broker, generating virtualization charging records, and receiving a request for a recommended virtualization server identifier from a virtualization broker or a virtualization client, where the request for the recommended virtualization server identifier includes context information. The virtualization server may be selected based on the context information and a virtualization server identifier may be sent to the virtualization broker or a virtualization client.

Embodiments disclosed herein further include a virtualization server entity in a network of connected entities comprising that, when executing stored instructions, effectuates operations including receiving a request to create a virtual resource from a first entity, determining to accept the request to create the virtual resource, creating the virtual resource, registering itself and physical resources to a virtualization management entity, reporting virtualization context information to a virtualization management entity, accessing virtualization polices from a virtualization management entity, adjusting a previously created virtual resource, combining previously created virtual resources, and transmitting a response to the first entity indicating that the virtual resource has been created.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

DETAILED DESCRIPTION OF ILLUSTRATIVE EMBODIMENTS

The embodiments set forth herein may be described in terms of a representational state transfer (REST) architecture, with components and entities described conforming to the constraints of a REST architecture (RESTful architecture). A RESTful architecture is described in terms of the constraints applied to components, entities, connectors, and data elements used in the architecture rather than in terms of physical component implementation or communications protocols used. Thus, the roles and functions of the components, entities, connectors, and data elements will be described. In a RESTful architecture, representations of uniquely addressable resources may be transferred between entities. One skilled in the art will recognize that implementations of the instant embodiments may vary while remaining within the scope of the present disclosure. One skilled in the art will also recognize that the disclosed embodiments are not limited to implementations using the ETSI M2M architecture that is used herein to describe exemplary embodiments. The disclosed embodiments may be implemented in other architectures and systems, such as one M2M and other M2M systems and architectures.

Figure 1:
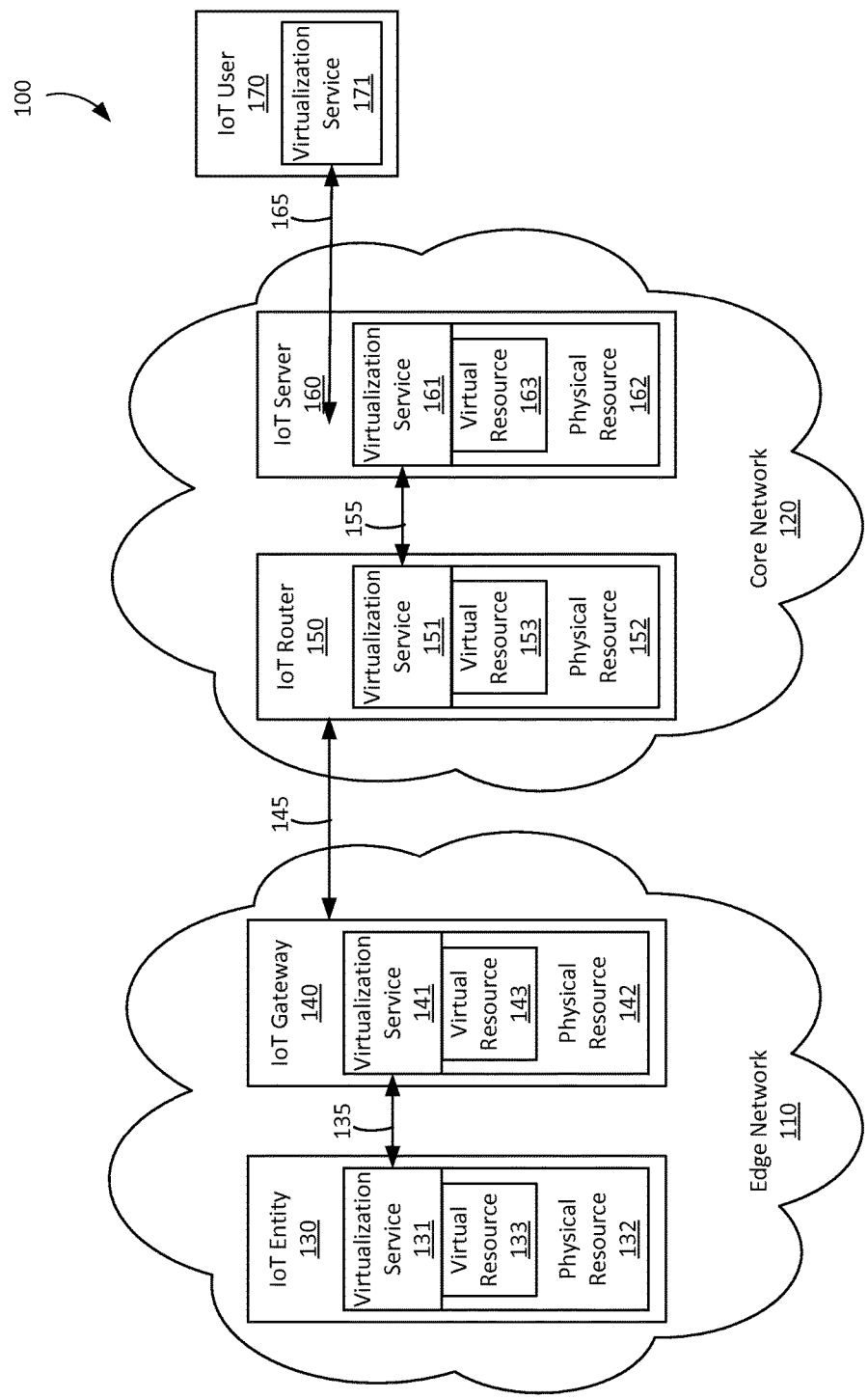
FIG. 1 illustrates an exemplary network configuration in which IoT virtualization services may be implemented according to an embodiment.

FIG. 1 illustrates an exemplary embodiment of the instant disclosure. System 100 may include edge network 110, within which IoT entity 130 and IoT gateway 140 may reside. IoT entity 130 may have physical resource 132. Physical resource 132 may be any physical resource, including, but not limited to, storage, computation or CPU, communication bandwidth, other provided services, sensors, actuators, etc. Physical resource 132 may be made available for use by other IoT entities as virtual resource 133 offered via virtualization service 131 and accessible via a service layer interface 135. Likewise, IoT gateway 140 may have physical resource 142 that may also be any physical resource and that may be made available for use by other IoT entities as virtual resource 143 offered via virtualization service 141 and accessible via service layer interface 135. Note that each of IoT entity 130 and IoT gateway 140 may use the other's virtual resources. There is no contemplated limitation on the direction of interaction over a logical interface that provides access to a virtual resource. That is, in many embodiments IoT entity 130 may use service 141 and IoT gateway 140 may use service 131.

Virtualized resources may be available across networks as well. IoT router 150 located in core network 120 may have physical resource 152 that may also be any physical resource and that may be made available for use by other IoT entities as virtual resource 153 offered via virtualization service 151 and accessible by entities in edge network 110, such as IoT gateway 140, via service layer interface 145. Here again, each of IoT router 150 and IoT gateway 140 may use the other's virtual resources. IoT server 160 located in core network 120 may have physical resource 162 that may also be any physical resource and that may be made available for use by other IoT entities as virtual resource 163 offered via virtualization service 161 and accessible by entities in core network 120, such as IoT router 150, via service layer interface 155. Each of IoT router 150 and IoT server 160 may use the other's virtual resources. IoT user 170 may use virtualization service 171 to access virtualized services via service layer interface 165. IoT user 170 may also use services representing physical resources of other IoT entities, such as using service 161 of IoT server 160 via service layer interface 165. Additional detail of these interactions and virtualizations are set forth herein.

Figure 2:
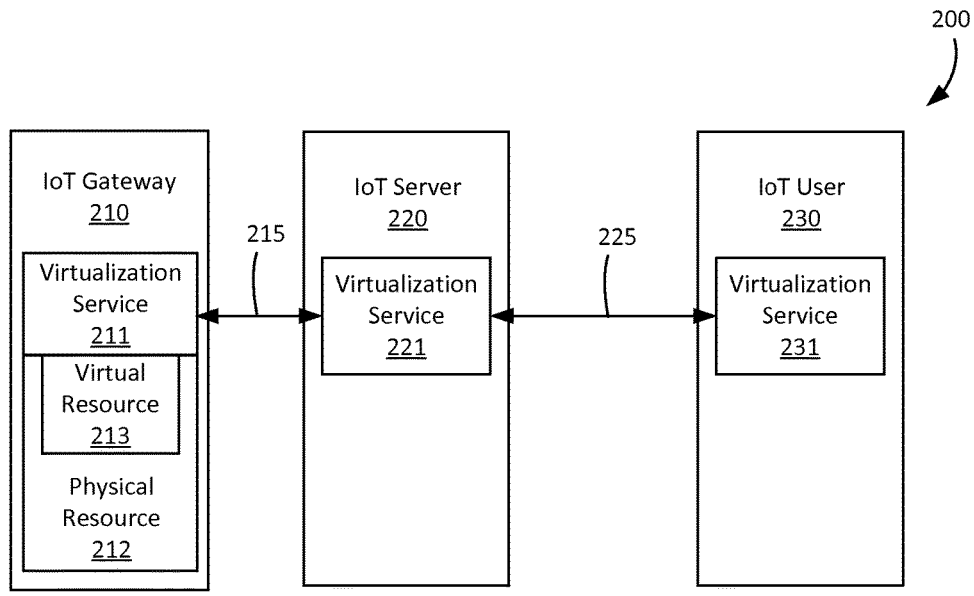
FIG. 2 illustrates an exemplary IoT configuration in which IoT virtualization services may be implemented according to an embodiment.

FIG. 2 illustrates another exemplary embodiment of the instant disclosure. System 200 may include IoT gateway 210 that may be configured to accept requests to create a virtual resource from a user. In response to such a request, IoT gateway 210 may create virtual resources 213 associated with physical resource 212 and made available via virtualization service 211. IoT user 230, through its virtualization service 231, may request, via service layer interface 225 to virtualization service 221 of IoT server 220, that a virtual resource be created. IoT server 220 may determine that the appropriate recipient for such a request is IoT gateway 210, and may forward the request to service 211 of IoT gateway 210 via service layer interface 215. In response, IoT gateway 210 may create the requested virtual resource.

Figure 3:
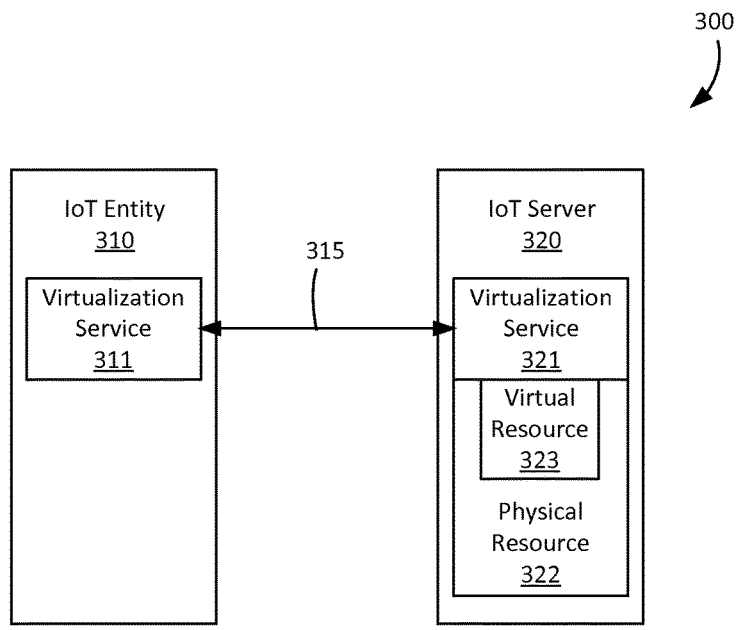
FIG. 3 illustrates another exemplary IoT configuration in which IoT virtualization services may be implemented according to an embodiment.

FIG. 3 illustrates another exemplary embodiment of the instant disclosure. System 300 may include IoT entity 310 that may be any IoT entity, such as a sensor node installed at a home for temperature monitoring, etc., and that may request that its own resources be virtualized and made available to other IoT entities as a service. IoT entity 310, through its virtualization service 311, may request via service layer interface 315 that IoT server 320's virtualization service 321 makes virtualization service 311 available. In response, IoT server 320 may advertise or otherwise make virtualization service 311 available, in some embodiments via virtualization service 321. Service 321 may also provide a virtual resource interface to virtual resource 323 associated with physical resource 322 of IoT server 320. In each of the systems described in FIGS. 1, 2, and 3, and in the remaining embodiment described herein, created virtual resources may be accessed or consumed by other IoT entities, such as IoT users, IoT servers, IoT routers, IoT gateways, IoT things/devices, and the like.

Figure 4:
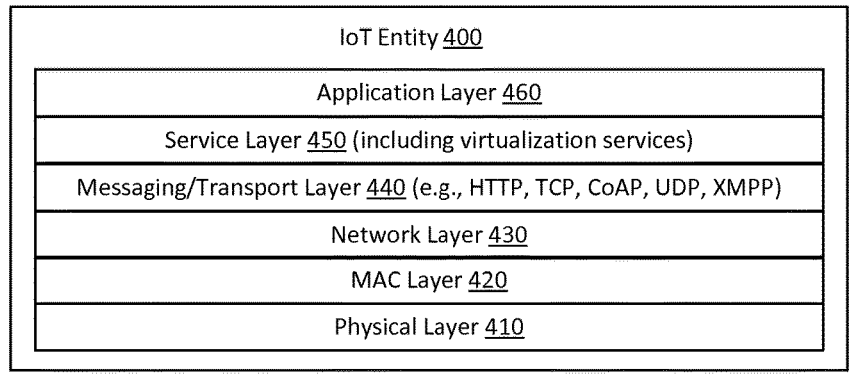
FIG. 4 illustrates an exemplary protocol stack according to an embodiment.

FIG. 4 illustrates an exemplary position of the exemplary virtualization services in a protocol stack implemented in exemplary IoT entity 400. The protocol stack may include physical layer 410, MAC layer 420, network layer 430, messaging and/or transport layer 440, service layer 450, and application layer 460. Virtualization services may reside at service layer 450 or on above of messaging/transport layer 440. Thus, the exemplary virtualization-related commands and messages may be contained in a payload of different messaging and/or transport protocols, such as HTTP, TCP, CoAP, UDP, XMPP, and the like.

In exemplary virtualization services, a physical resource may generate multiple virtual resources that each may be shared by different users. Upon creation of such virtual resources by one or more virtualization services as set forth herein, each virtual resource may be requested, accessed, or assigned to various users in a transparent way. For example, a network provider may deploy several types of network resources, such as access points and gateways, along roadways or elsewhere about or proximate to a community. In an embodiment, these physical access points may be shared by different IoT service providers and/or other types of service providers. The disclosed virtualization services may enable efficient and flexible virtualization management between the physical resource provider and a service provider. Such management may include virtual resource creation, monitoring, and cancellation, among other functions. Physical access point manufacturers may support the disclosed virtualization functions (e.g. a virtualization server as described herein) so that the manufactured physical access point may receive virtualization commands and create corresponding virtual resources.

For example, in an embodiment, a gateway or access point may connect a sensor network to the Internet. In the sensor network, each sensor node may be an IoT device, such as a temperature sensor or a pressure sensor. The sensor network may be deployed and owned by an IoT service provider, or owned by and/or deployed by a network provider and accessed or otherwise used by an IoT service provider, using the embodiments set forth herein.

Figure 5:
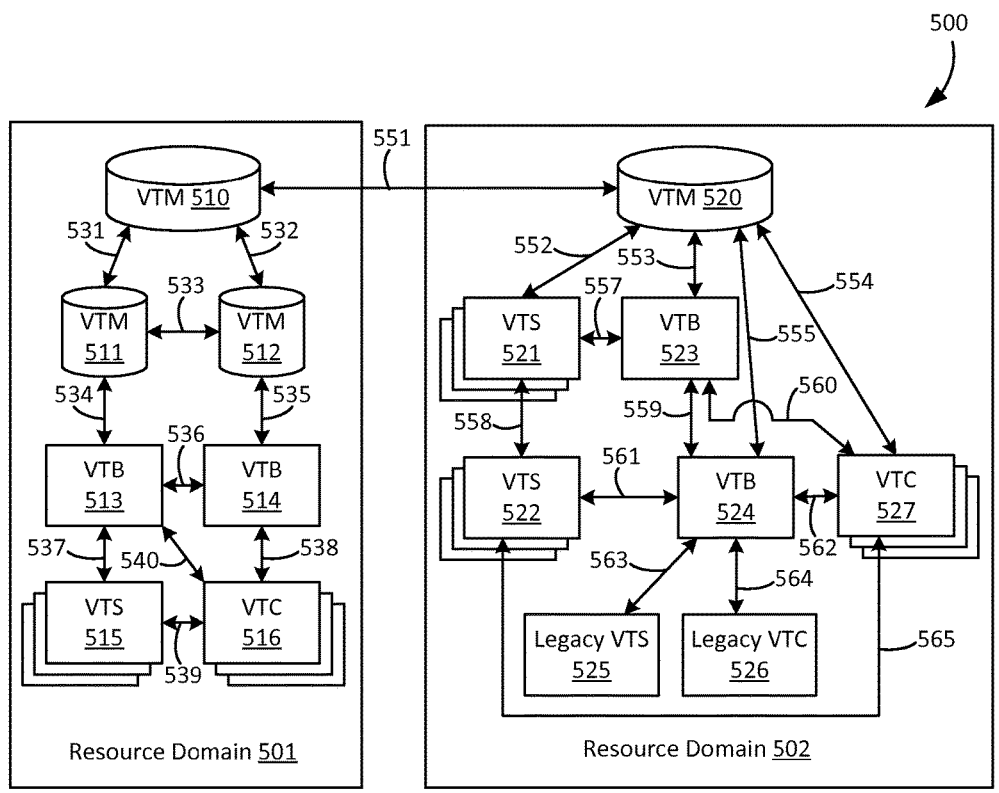
FIG. 5 illustrates another exemplary IoT configuration in which IoT virtualization services may be implemented according to an embodiment.

FIG. 5 illustrates exemplary virtualization service architecture 500 that may be used with a variety of standards. Some of the contemplated standards applications are listed in Table 1 below that provides application examples for the disclosed virtualization services.

TABLE 1

| Standards | Possible Applications |
|---|---|
| ETSI TC M2M | The exemplary architecture and virtualization service functions (i.e. VTC, VTS, VTB, and VTM) can be integrated into M2M service capability layer (SCL). For example, VTM can integrate with network SCL (NSCL), VTB can integrated with gateway SCL (GSCL), and VTS can integrate with device SCL (DSCL). |
| | New resource structures can to be developed to support the exemplary virtualization service procedures. |
| oneM2M | Since one M2M targets M2M service layer, the exemplary virtualization architecture and service functions are potentially within its scope and can be adopted as advanced M2M service functions. |
| 3GPP | 3rd Generation Partnership Project (3GPP) has study/work item about network sharing (as discussed in 3GPP TS 23.251: "Network sharing; Architecture and functional description", which is hereby incorporated by reference in its entirety) such as base station virtualization and sharing. In addition, it is possible to virtualize a physical smart phone into multiple virtual phones. As a result, the exemplary virtualization architecture and service functions can be integrated into 3GPP control plane. |
| | New signaling protocols based on non-access stratum (NAS) or short message service (SMS) or other approaches can be developed to support the exemplary virtualization procedures. |

TABLE 1-continued

| Standards | Possible Applications |
|---|---|
| IETF/IRTF | The exemplary virtualization architecture and service functions can be applied to IETF constrained management (COMAN) and Internet Research Task Force (IRTF) software defined networking research group (SDNRG) (as discussed in 3GPP TS 23.251: "Network sharing; Architecture and functional description", which is hereby incorporated by reference in its entirety). For example, new management data model can be developed for the exemplary virtualization architecture and service functions. |
| OMA | Virtualization can be a type of device management (DM) functions. The exemplary virtualization architecture and service functions can be applied to Open Mobile Alliance (OMA) especially to OMA Device Management (DM).<br>New management objects can be developed to support the exemplary virtualization procedures. |
| ONF | The exemplary virtualization architecture and service functions can extend Open Networking Foundation (ONF) OpenFlow protocol (as discussed in 3GPP TS 23.251: "Network sharing; Architecture and functional description", which is hereby incorporated by reference in its entirety) by adding support for virtualization functions since the current OpenFlow only supports dynamic configuration of routing tables. |

In FIG. 5, general virtualization service architecture 500 illustrates how IoT resources may be managed in different resource domains. The definition of a "resource domain" may vary in some embodiments. For example, all IoT systems and elements of an IoT service provider may be regarded as a single resource domain or an IoT service provider may divide all IoT resources into multiple domains based on criteria such as resource location, resource type, supported service and/or application categories, scalability, and the like.

In the exemplary general virtualization service architecture depicted in FIG. 5, each of resource domains 501 and 502 may include one or more of the elements listed in Table 2 below, which describes the functions of a virtualization manager (may also be referred to as a "VTM" and as a "virtualization management entity"), a virtualization server (may also be referred to as a "VTS" and as a "virtualization server entity"), a virtualization client (may also be referred to as a "VTC" and as a "virtualization client entity"), and a virtualization broker (may also be referred to as a "VTB" and as a "virtualization broker entity"). In an embodiment, each element is a logical service function and a virtualization service. Thus, each virtualization element may reside in various IoT entities as depicted in FIGS. 1-3. The functions of each virtualization element are described in more detail herein

TABLE 2

| Architecture Elements | Functions |
|---|---|
| Virtualization Manager (VTM)<br>(e.g., 510, 511, 512, and 520 in FIG. 5) | Manage resources, virtualization policies and virtualization context.<br>Facilitate interactions between VTC and VTS (or VTB), between VTBs, or between VTS.<br>Perform virtualization algorithms to identify appropriate VTS.<br>Facilitate/trigger dynamic virtualization adjustment or adaptation driven by virtualization policy and context information. |
| Virtualization Server (VTS)<br>(e.g., 515, 521, and 522 in FIG. 5) | Register resources to VTM.<br>Create virtual resources as requested by VTC or VTB.<br>Collaborate with other VTS to enable collaborative virtualization such as virtual resource migration.<br>Execute dynamic virtualization adjustment or adaptation as triggered by virtualization policy, virtualization context, or VTM/VTB/VTC.<br>Monitor the performance of virtual resources and report to VTM. |
| Virtualization Client (VTC)<br>(e.g., 516 and 527 in FIG. 5) | Discover appropriate VTS or VTB from VTM.<br>Issue virtualization requests to VTS or VTB. |
| Virtualization Broker (VTB)<br>(e.g., 513, 514, 523, and 524 in FIG. 5) | Assist interactions between VTC and VTS.<br>Process and translate virtualization requests from VTC.<br>Perform virtualization algorithms to identify appropriate VTS.<br>Interwork legacy VTS and VTC to the exemplary VTS and VTC. |
| Legacy VTS (e.g., 525 in FIG. 5) | Only supports conventional or proprietary virtualization protocols. |
| Legacy VTC (e.g., 526 in FIG. 5) | Only supports conventional or proprietary virtualization protocols. |

In general virtualization service architecture 500, virtualization elements may interact with each other over the exemplary virtualization interfaces listed below in Table 3 to realize the virtualization functions described herein.

TABLE 3

| Interfaces | Description |
|---|---|
| VT1<br>(e.g., 539, 565 in FIG. 5) | Interface between a VTS and a VTC to support the following interactions:<br>Basically, the VTC issues virtualization requests to the VTS and receives response back from the VTS via this interface. |

TABLE 3-continued

| Interfaces | Description |
| --- | --- |
| | Later, the VTC can issue requests to the VTS to cancel a pending virtualization request or to adjust/retrieve/delete the created virtual resource. |
| VT2 (e.g., 554 in FIG. 5) | Interface between a VTC and a VTM to support the following interactions: The VTC discovers appropriate VTS or VTB from VTM. |
| VT3 (e.g., 552 in FIG. 5) | Interface between a VTS and a VTM to support the following interactions: The VTS registers its resources to VTM, and can update the registered resources at the VTM. The VTS reports context information about itself and its resources to the VTM. The VTS accesses virtualization policies and virtualization context information maintained at the VTM. The VTM updates and enforces new virtualization policies at the VTS. |
| VT4 (e.g., 531, 532, and 551 in FIG. 5) | Interface between a VTM and another VTM to support the following interactions: VTMs exchange information about VTS and VTB and their resource and context information. VTMs collaboratively serve discovery requests from VTCs. VTMs collaboratively serve virtualization computation offloading from VTBs or VTSs. VTM collaboratively manage virtualization policies and virtualization context. |
| VT5 (e.g., 538, 540, 562, 560 in FIG. 5) | Interface between a VTC and a VTB to support the following interactions: The VTC issues virtualization requests to a VTB via this interface. Later, the VTC can issue requests to the VTB to cancel a pending virtualization request or to adjust/retrieve/delete the created virtual resource. |
| VT6 (e.g., 537, 557, 561 in FIG. 5) | Interface between a VTS and a VTB to support the following interactions: The VTB forwards virtualization requests to a VTS via this interface. Later, the VTB can issue requests to the VTB to cancel a pending virtualization request or to adjust/retrieve/delete the created virtual resource. |
| VT7 (e.g., 536, 559 in FIG. 5) | Interface between a VTB and another VTB to support the following interactions: One VTB can forward virtualization requests to other VTBs (one or more). One VTB can cancel pending virtualization requests maintained at other VTBs. |
| VT8 (e.g., 558 in FIG. 5) | Interface between a VTS and another VTS to support the following interactions: A VTS moves the created virtual resource from one VTS to another VTS. A VTS requests or borrows more resources from another VTS. |
| VT9 (e.g., 534, 535, 553, and 555 in FIG. 5) | Interface between a VTB and a VTM to support the following interactions: The VTB registers itself and reports its context information to VTM. The VTB accesses virtualization policies and virtualization context information maintained at the VTM. The VTM updates and enforces new virtualization policies at the VTB. The VTB offloads virtualization computation to the VTM. |
| VT10 (e.g., 563 in FIG. 5) | Interface between a legacy VTS and a VTB to support the following interactions: The VTB translates virtualization request from a VTC into the legacy virtualization request which the legacy VTS can understand. |
| VT11 (e.g., 564 in FIG. 5) | Interface between a legacy VTC and a VTB to support the following interactions: The VTB translates the legacy virtualization request from the legacy VTC into the format which the VTB or VTS can understand. |

In an exemplary embodiment, a VTM (e.g., 510, 511, 512, and 520 in FIG. 5) may maintain the list of IoT resources within a resource domain. A VTM may also maintain virtualization-related policy and context information. A VTM may update and enforce the virtualization policy at a VTB, a VTS, and/or another VTM. In an example embodiment, a resource domain may have one or more than one VTM, as seen in, for example, in FIG. 5, where VTMs 510, 511 and 512 reside in resource domain 501. A VTM may perform simple resource discovery via communications with one or more of a VTC, VTB, or VTM, and may also, or instead, use complex virtualization algorithms to identify appropriate resources as requested by a VTC, VTB, or VTM. A VTM may assist a resource or a VTS, VTB, or VTC in moving from one resource domain to another resource domain. Multiple VTMs within one resource domain (e.g., VTMs 510, 511 and 512 in FIG. 5) may form a hierarchical or mesh structure to improve resource maintenance and discovery performance A VTM may also facilitate collaboration between VTSs or between VTBs.

In an exemplary embodiment, a VTS (e.g., 515, 521, and 522 in FIG. 5) may have access to one or more physical resources. A VTS may receive a virtualization request from a VTC or a VTB and, in response, may create the requested virtual resource. Virtual resources may be created according to parameters and requirements contained in one or more policies received from a VTM. A VTS may register and update its resources to a VTM. VTSs may communicate with each other to enable cross-VTS collaborative resource virtualization and management.

VTCs (e.g., 516 and 527 in FIG. 5) may send virtualization requests to a VTS or a VTB to request virtual resource creation. Before sending such a request, a VTC may send a discovery request to a VTM to determine the appropriate VTS and/or VTC to which to send the request.

A VTB (e.g., 513, 514, 523, and 524 in FIG. 5) may assist in interactions between a VTC and a VTS as an intermediary node. For example, a VTB may intelligently process incoming virtualization requests from a VTC (e.g., a VTB may buffer and/or merge requests before forwarding them to a VTS). Multiple VTBs may form a hierarchical or mesh broker structure to improve performance and scalability. A VTB may facilitate communication and interoperability between legacy VTSs and VTCs (e.g., 525 and 526, respectively, in FIG. 5) and the disclosed VTSs and VTCs.

Table 4 below lists several exemplary IoT virtualization scenarios and exemplary locations of VTCs, VTSs, and VTBs. Also shown in Table 4 are example protocols that may support the disclosed virtualization interfaces. For example, virtualization request messages and corresponding responses may be bound to protocols such as HTTP and CoAP, among others. Protocols such as HTTP or CoAP may be used as an underlying transport protocol for carrying various virtualization service request and response messages. Virtualization request and response messages may be encapsulated within the payload of HTTP or CoAP message. Alternatively, or in addition, some information within a virtualization service request or response may be bound to fields within HTTP and/or CoAP headers and/or options. For example, in an embodiment, virtualization service requests and response protocol primitives may be encoded as JavaScript Object Notation (JSON) or eXtensible Markup Language (XML) descriptions that may be carried in the payload of HTTP or CoAP request and response messages. Thus, virtualization functions and services may encode and/or decode virtualization service protocol JSON and/or XML primitives and may use HTTP and/or CoAP as an underlying transport for exchanging these virtualization service primitives. In other embodiments, rather than using existing protocols, the exemplary virtualization interfaces and the messages transmitted using such interfaces may be implemented as a new virtualization service protocol.

and VTM 620. Virtualization interface VT4 615 may enable communication between VTM 610 and VTM 620. As noted above in Table 4, several IoT virtualization scenarios are contemplated, with some example locations of each VTC, VTS, and VTM provided in the table.

A VTS (e.g., VTS 630 in FIG. 6) may be a system with a logic service function. A VTS may reside on any IoT entities that provide or have access to a physical resource (e.g., IoT devices, IoT gateways, IoT servers). In some embodiments, a VTS may receive virtualization requests from a VTC and create virtual resources for the VTC in response. The created virtual resource may be co-located with the physical resource. For example, an IoT network application (i.e., the VTC) may issue a virtualization request to an IoT device (i.e., the VTS) to virtualize the IoT device into multiple virtual devices via a VT1 interface (e.g., VT1

TABLE 4

| Scenarios | Description | Virtualization Service Functions | Virtualization Interface and Protocol Example |
|---|---|---|---|
| 1. IoT Device Virtualization | A 3GPP MTC device has multiple sensors integrated (e.g. temperature, smoke, humidity, etc.). An IoT network application directly talks to the MTC device to request to create a virtual MTC device with a temperature sensor. | VTC: The IoT network application. VTS: Service function at the MTC device. VTM: Service function at the 3GPP core network. | VT1: HTTP Protocol VT2: HTTP Protocol VT3: HTTP Protocol |
| 2. IoT Device Virtualization | A 3GPP MTC device has multiple sensors integrated (e.g. temperature, smoke, humidity, etc.). ). An IoT network application indirectly talks to the MTC device via 3GPP core network entities (e.g. MTC-IWF) to request to create a virtual MTC device with a humidity sensor. | VTC: The IoT network application. VTB: Service function at a 3GPP core network entity (e.g. MTC-IWF). VTS: Service function at the MTC device. VTM: Service function at the 3GPP core network. | VT5: HTTP Protocol VT6: HTTP Protocol VT9: HTTP Protocol |
| 3. IoT Gateway Virtualization | An IoT gateway (e.g. a WiFi access point with cellular connection) is deployed along the roadside. The gateway provides connections for both moving vehicles and a sensor network for monitoring potential landslide. An IoT server in the cloud wants to create two virtual gateways: one for traffic monitoring and intelligent transport system, and another for landslide monitoring. | VTC: Service function at the IoT server. VTS: Service function at the IoT gateway. VTM: Service function at the IoT server. | VT1: HTTP Protocol VT2: HTTP Protocol VT3: HTTP Protocol |
| 4. IoT Sensor Network Virtualization | An IoT gateway connects a large-scale sensor network which is deployed in a city. The sensor network provides various sensory data such as temperature, pollution, light, traffic, etc. An IoT server deployed in the cloud wants to request and create multiple different virtual sensor networks. Each virtual sensor network supports different applications such as air quality monitoring, weather prediction, etc. | VTC: Service function at the IoT server VTB: Service function at the IoT gateway VTS: Service function at the IoT sensor node VTM: Service function at the IoT server. | VT5: HTTP Protocol VT6: CoAP Protocol VT9: HTTP Protocol |
| 5. IoT Thing Virtualization | An IoT thing wants to virtualize itself to IoT server so that accesses to the physical thing can be offloaded onto the virtual thing to be created in the IoT server. IoT server may create multiple virtual things for the same physical IoT thing. Note that the IoT thing may have a communication module to connect itself to the Internet, likely via an IoT gateway. | VTC: Service functions at the IoT thing. VTB (optional): Service function at the IoT gateway. VTS: Service functions at the IoT server. VTM: Service function at the IoT server. | VT5: CoAP Protocol VT6: HTTP Protocol VT9: HTTP Protocol |

Figure 6:
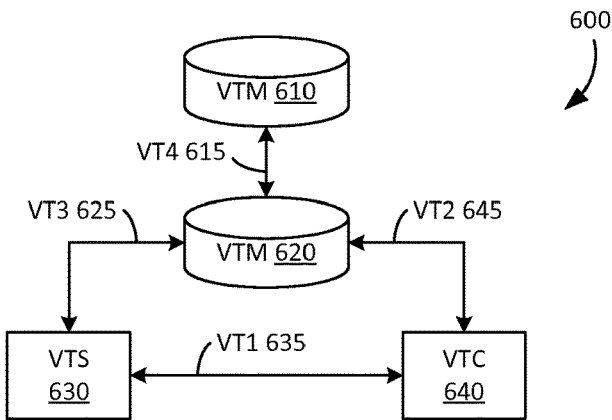
FIG. 6 illustrates another exemplary IoT configuration in which IoT virtualization services may be implemented according to an embodiment.

FIG. 6 illustrates exemplary VTC-to-VTS virtualization architecture 600, which may include VTS 630, VTC 640, VTMs 610 and 620. Virtualization interface VT1 635 may enable communication between VTS 630 and VTC 640. Virtualization interface VT2 645 may enable communication between VTC 640 and VTM 620. Virtualization interface VT3 625 may enable communication between VTS 630

635 in FIG. 6). Note that an internal interface between a VTS and any physical resources may be needed at the IoT entity where the VTS resides.

A VTS may perform a variety of operations. Among these is resource registration, where a VTS registers itself and its physical resources to a VTM using a VT3 (e.g., VT3 625 in FIG. 6) interface so that a VTC may discover an appropriate VTS, or so that a VTM may summarize its VTSs and re-register them to another VTM. A VTS may register to multiple VTMs.

Another operation performed by a VTS may be virtualization request management, where a VTS analyzes virtualization requests from a VTC received via a VT1 interface. A VTS may accept, reject, or buffer such incoming virtualization requests. Upon the request from a VTC after receiving a virtualization request from that VTC, a VTS may cancel a buffered and/or pending virtualization request.

Still another operation performed by a VTS may be virtual resource creation, where a VTS creates a virtual resource upon the request of a VTC and sends a response back to the requesting VTC via the VT1 interface. A VTS may report the created virtual resource to a VTM via a VT3 interface.

Yet another operation performed by a VTS may be virtual resource management, where a VTS may receive further requests from a VTC to cancel, adjust, or retrieve an existing virtual resource, or to combine multiple virtual resources.

Another operation performed by a VTS may be virtualization context management. Virtualization context information may include, but is not limited to, supported virtualization type(s) at a VTS, virtualization pricing information, and information about a virtual resource such as a VTC's requirements, performance measurement, corresponding physical resource, lifetime, etc. A VTS may create such context information for each virtual resource. A VTS may monitor the created virtual resources to ensure that the virtual resource performance meets the VTC's requirements. If there is potential issue about a created virtual resource, a VTS may automatically increase allocated physical resources, send notification to the associated VTC, and/or report the issue to a VTM.

Still another operation performed by a VTS may be virtualization policy management, where a VTS may access virtualization policies maintained at a VTM. VTS may download certain virtualization policies from the VTM and maintain them locally.

A VTC (e.g., VTC 640 in FIG. 6) may be a system with a logic service function that sends virtualization requests to a VTS to create virtual resources. A VTC may be a user application or may reside in other IoT entities. For example, a VTC such as an IoT network application may send a virtualization request to an IoT device, such as a VTS, requesting that the IoT device virtualize itself into multiple virtual devices.

A VTC may perform a variety of operations. Among these is VTS lookup, where a VTC sends a lookup request to a VTM via interface VT2 (e.g., VT2 645 in FIG. 6) to discover potential VTSs that may be able to provide desired virtual resources. A VTC may subscribe to a VTM and receive automatic notifications from the VTM when there are new VTSs available, previously available VTSs are no longer available, and/or when any other VTS status or state changes.

Another operation performed by a VTC may be virtual resource creation, where a VTC sends a virtualization request to a VTS to request the creation of a virtual resource. A VTC may send multiple, different virtualization requests to a VTS sequentially or simultaneously. Simultaneous transmission of requests enables a VTS to consider the multiple requests together and in turn more requests may be allowed and satisfied, resulting in an increased virtualization success rate. In contrast, sequential virtualization request processing, where each virtualization request is processed sequentially and independently, may result in a lower virtualization success rate. A VTC can cancel a previously transmitted and still pending virtualization request at a VTS by send a cancellation to the VTS via a VT1 interface.

Another operation that may be performed by a VTC may be virtual resource management, where a VTC issues, via VT1 interface, additional requests to cancel, adjust, or retrieve an existing virtual resource, and/or to combine multiple virtual resources at a VTS.

A VTM (e.g., VTC 620 in FIG. 6) may be a system with a logic service function that facilitates interactions between a VTC and a VTS. It may reside in an IoT server and/or in the cloud. Optionally, a VTM may be a part of a VTS that is hidden from VTCs.

A VTM may perform a variety of operations. Among these is physical/virtual resource management, where a VTM may maintain a list of available VTSs and their physical resources that may be queried by a VTC or a VTS. A VTM may interact with another VTM via a VT4 interface (e.g., VT4 615 in FIG. 6) so that multiple VTMs may collaboratively keep track of available VTSs and physical resources in a more scalable approach. Optionally, a VTM may maintain a mapping relationship between physical resources and virtual resources for management purposes that may be inaccessible to VTC.

Another operation that may be performed by a VTM is virtualization policy management, where a VTM may dynamically adjust, void, and/or push virtualization policies to a VTS via a VT3 interface. A VTM may dynamically push or pull virtualization policies from another VTM via a VT4 interface.

Another operation that may be performed by a VTM is virtualization context management, where a VTM may maintain virtualization context information about physical and virtual resources that may be accessed and/or manipulated by a VTS and/or a VTC.

Another operation that may be performed by a VTM is virtualization charging management, where a VTM maintains lookup history information from VTCs, and maintains virtualization request processing results as reported by a VTS. Based on this information, a VTM may generate virtualization charging records.

A VT1 interface (e.g., VT1 635 in FIG. 6) may be a system that handles interactions between a VTS and a VTC. Such interactions may include VTC requests to create, update, adjust, and/or remove virtual resources at VTS. For example, a VTC may request that multiple virtual resources previously created by a VTS be combined. These interactions may also include VTC requests to cancel a pending virtualization request at VTS. Such interactions may further include a VTS sending notifications to a VTC about changes and monitored performance in virtual resources. Such interactions may also include a VTS and a VTC establishing and maintaining a logic connection over VT1 so that the VTS may send notifications such as performance results of virtual resources to VTC.

A VT2 interface (e.g., VT2 645 in FIG. 6) may be a system that facilitates interactions between a VTC and a VTM. Such interactions may include a VTC sending a VTM a lookup request asking the VTM to find desired VTSs and the VTM sending a response back to the VTC. These interactions may also include a VTC accessing virtualization policies and virtualization context information maintained at a VTM. These interactions may further include a VTC sending a resource subscription to a VTM and receives automatic notification from the VTM about changes in VTSs, virtualization policies, and/o virtualization context information.

A VT3 interface (e.g., VT3 625 in FIG. 6) may be a system that handles interactions between a VTS and a VTM. The interactions may include a VTS registering itself to a VTM. During registration, the VTS may indicate pricing information and other virtualization context information. The interactions may further include a VTS reporting its physical resource and created virtual resources to a VTM. Such interactions may further include a VTS reporting virtualization request process results to a VTM and a VTS reporting malicious VTCs to a VTM. A VTM can block "VTS lookup" messages from VTCs identified as malicious.

A VT4 interface (e.g., VT4 615 in FIG. 6) may be a system that handles interactions between two VTMs. These interactions may include a VTM forwarding and/or aggregating a VTS registration to another VTM, a VTM looking up a desired VTS from another VTM, and a VTM accessing and adjusting virtualization policies at another VTM.

Figure 7:
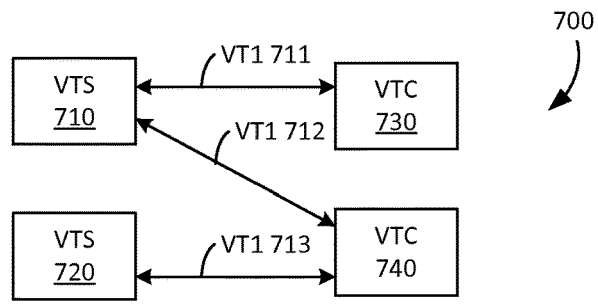
FIG. 7 illustrates another exemplary IoT configuration in which IoT virtualization services may be implemented according to an embodiment.

FIG. 7 illustrates system 700 where a VTS (or, in other embodiments, a VTC) may interface with multiple VTCs (or, in other embodiments, one or more VTSs) based on the basic virtualization service architecture disclosed herein. In a one-VTC-multiple-VTS embodiment (e.g. VTC 740 in FIG. 7), a VTS (e.g. VTC 720 in FIG. 7) may not be able to provide enough resources to fulfil a request by a VTC. In this case, the VTC can choose multiple VTSs and send separate virtualization requests to each of them. However, the VTC may determine how many and which VTSs are to be selected in the basic VTC-to-VTS virtualization service architecture. In a one-VTS-multiple-VTC embodiment, a VTS (e.g., VTS 710 in FIG. 7) may service multiple VTCs. A VTS can create and provide virtual resources for multiple VTCs if the VTS have enough physical resources.

Figure 8:
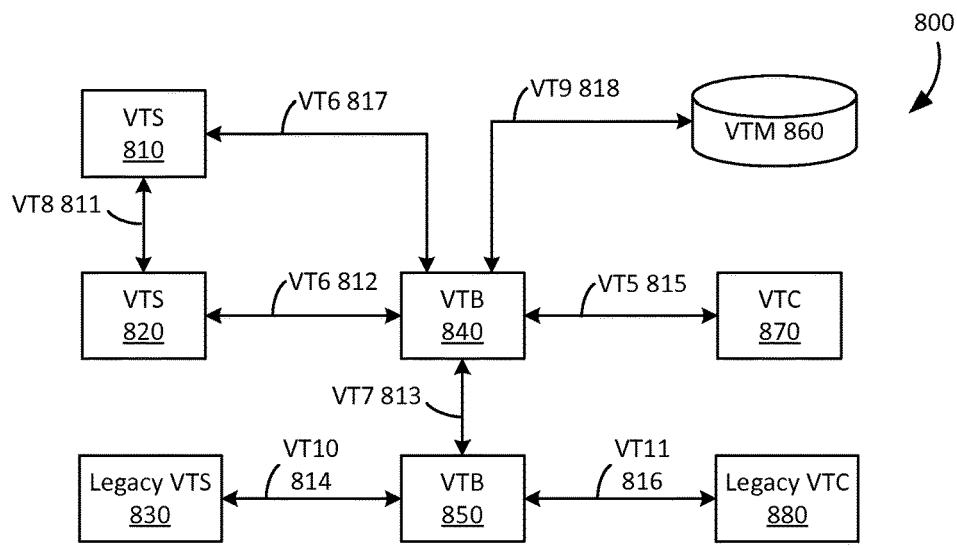
FIG. 8 illustrates another exemplary IoT configuration in which IoT virtualization services may be implemented according to an embodiment.

FIG. 8 shows exemplary system 800 illustrating an embodiment of a broker-based virtualization service architecture, where a VTB is a system with a logic service function and one or more virtualization interfaces. Table 4 above lists several IoT virtualization embodiments and details the locations of VTBs in such embodiments. A VTB (e.g. VTB 840 and VTB 850 in FIG. 8) may perform the functions and operations of both a VTC and a VTS to coordinate interactions between a VTS and a VTC in either a transparent or a non-transparent way. For example, a VTB can connect a VTC to legacy VTS. A VTB may coordinate multiple VTSs and may interface with another VTB as well.

A VTB may perform a variety of operations. Among these is a VTB registering itself to a VTM so that a VTC and a VTS may discover the potential VTB from the VTM. A VTB may also receive virtualization requests from a VTC and forward such requests to a VTS. A VTB may search and select one or more appropriate VTSs on behalf of a VTC. A VTB may split a single virtualization request into multiple virtualization requests. A VTB may also aggregate multiple virtualization requests into a single virtualization request.

Other operations that a VTB may perform include buffering incoming requests and forwarding them to a VTS in a differentiated and prioritized manner. A VTB may serve VTCs on behalf of a VTS. A VTB may coordinate virtual resource migration from one VTS to another VTS. A VTB may receive virtualization requests from a VTC and forward them to another VTB. A VTB may interface with a VTM to discover and select a proper VTS and/or VTB. A VTB may interface with a VTM to access virtualization policies and virtualization context information, in one embodiment to user in dynamic policy adjustment and enforcement. A VTB may facilitate the interworking of different types of VTSs and VTCs. For example, as shown in FIG. 8, VTB 850 interfaces with legacy VTS 830 via the legacy virtualization interface VT10 814. VTB 850 may perform translation between legacy VTS 830 and VTC 840.

A Legacy VTS (e.g., legacy VTS 830) may be a system that has a traditional logic service function to support resource virtualization. It may not be able to communicate with VTCs or other VTSs directly. Instead, it may communicate with, for example, VTS 820 through VTB 850 via legacy interface VT10 814.

A VT5 interface (e.g., VT5 815 in FIG. 8) may be a system that handles interactions between a VTC and a VTB. A VT5 interface may support similar functions as a VT1 interface.

A VT6 interface (e.g., VT5 812 and VT6 817 in FIG. 8) may be a system that handles interactions between a VTB and a VTS. A VT6 interface may also support similar functions as a VT1 interface, but may also support additional functions that are related to VTB-controlled multi-VTS coordination (discussed in more detail herein).

A VT7 interface (e.g., VT7 813 in FIG. 8) may be a system that handles interactions between two VTBs. Such interactions may include one VTB forwarding virtualization requests to another VTB, and transmission of a virtualization response to the forwarding VTB.

A VT8 interface (e.g., VT8 811 in FIG. 8) may be a system that handles interactions between two VTSs. Such interactions may include direct VTS-to-VTS interactions, for example, as used in VTB-controlled multi-VTS coordination (discussed in more detail herein). A VT8 interface may also supports virtual resource migration from one VTS to another VTS. In some embodiments, a VTC is not notified of the migrated virtual resource.

A VT9 interface (e.g., VT9 818 in FIG. 8) may be a system that handles interactions between a VTB and a VTM. A VT9 interface may support similar functions as a VT2 interface and a VT3 interface.

A VT10 interface (e.g., VT10 814 in FIG. 8) may be a system that handles interactions between a VTB and a legacy VTS. A VT10 interface may be a legacy or proprietary virtualization interface A VT11 interface (e.g., VT11 816 in FIG. 8) may be a system that handles interactions between a VTB and a legacy VTC. A VT11 interface may also be a legacy or proprietary virtualization interface.

Figure 9:
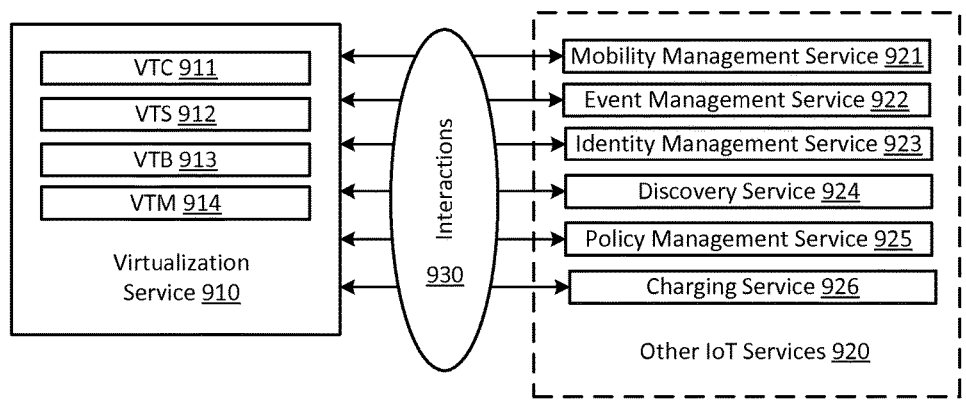
FIG. 9 illustrates another exemplary IoT configuration in which lot virtualization services may be implemented according to an embodiment.

FIG. 9 illustrates example interactions 930 between virtualization service 910 and other IoT services 920. The exemplary virtualization elements or functions (e.g., VTC 911, VTS 912, VTB913, and VTM 914) may be implemented as IoT services and referred to as virtualization services. An IoT service platform may include services such as mobility management service 921, event management service 922, identity management service 923, discovery service 924, policy management service 925, and charging service 926, among others. Virtualization service 910 may interface with those IoT services to make IoT resource virtualization more efficient by using the following interactions.

Virtualization service 910 may receive a trigger from mobility management service 921 to trigger a new virtualization, virtualization cancellation, or virtualization adjustment/adaptation. Virtualization service 910 may use mobility management service 921 to assist in fulfilling virtual resource migration.

Virtualization service 910 may generate and/or create new events that may be provided to event management service 922. Virtualization service 910 may receive a trigger from event management service 922 to trigger a new virtualization, a virtualization cancellation, or a virtualization adjustment or adaptation. Virtualization service 910 may manipulate events (e.g., virtualization-related events) in event management service 922 (e.g., retrieving, updating, deleting, combining events).

Virtualization service 910 may request services from identity management service 923 such as identity mapping for authentication and other security purposes. Virtualization service 910, and in particular VTS 911 and VTM 914, may create and store a new identity or identifier for a newly created virtual resource (e.g., object, sensor, connectivity, network, etc.). Virtualization service 910 may access and manipulates virtualization-related identities or identifiers stored in identity management service 923.

Virtualization service 910 may use discovery service 924 to find other services, such as mobility management service 921, event management service 922, identity management service 923, policy management service 925, and charging service 926. Alternatively, or in addition, virtualization service 910 may use discovery service 924 to discover other virtualization services.

Virtualization service 910 may obtain virtualization-related policies from policy management service 925. Such policies may be retrieved by virtualization service 910 when needed and/or received as automatic transmissions from policy management service 925. Policy management service 925 may update or cancel existing virtualization-related policies at VTM 914, VTB913, and/or VTS 912.

Virtualization service 910 may keep records of virtualization requests and virtual resources and may generate charging records to be provided to charging service 926. Charging service 926 may configure and manage virtualization service 910's charging record generation operations. Charging service 926 may access and pull charging records generated by virtualization service 910.

In an embodiment, messages may be exchanged between two virtualization elements (e.g., VTC, VTS, VTB, and VTM) over different virtualization interfaces as described herein. Messages may be contained in different protocols (e.g., HTTP and CoAP) as payload and/or within headers or options fields. Table 4 above illustrates several examples of the interfaces to which HTTP and CoAP may be applied to. Alternatively, a new virtualization service protocol may be used to transport virtualization request and response messages.

Figure 10:
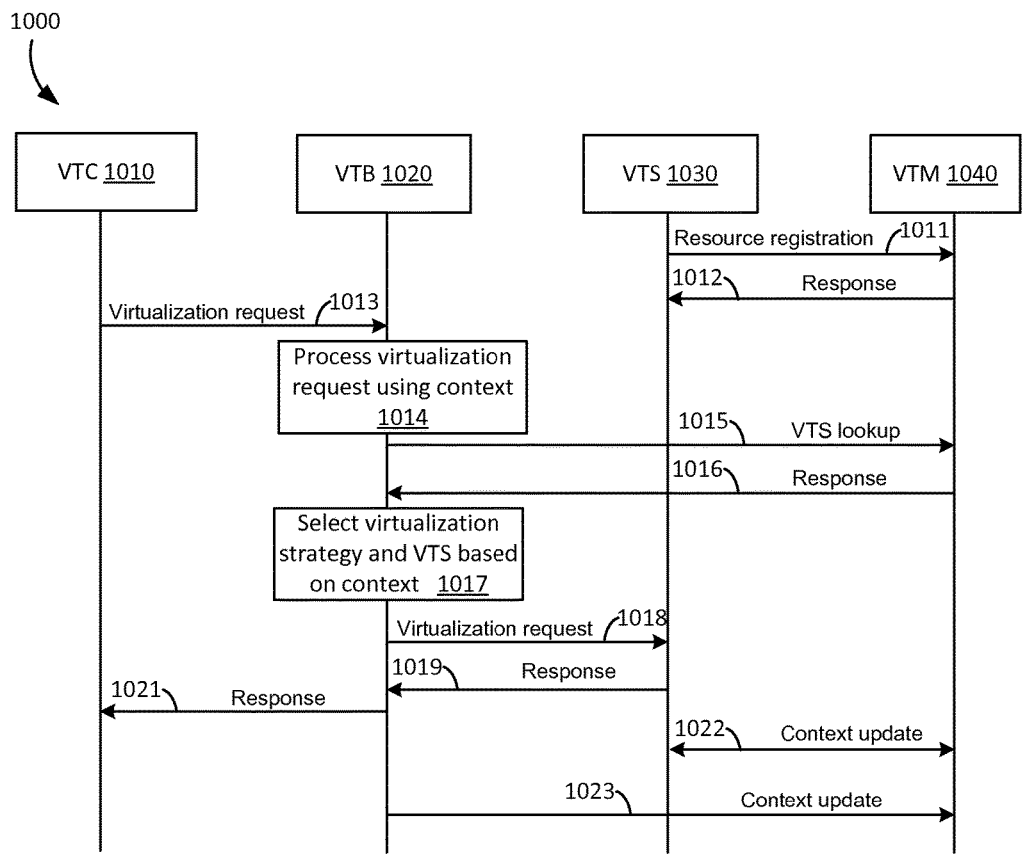
FIG. 10 illustrates an exemplary signal flow that may be used for which IoT virtualization services according to an embodiment.

FIG. 10 illustrates exemplary signal flow 1000 that may be used in context-aware virtualization embodiments. In such embodiments, VTC 1010 may requests that a virtual resource be created at VTS 1030 via VTB 1020. The exemplary embodiment illustrated in FIG. 10 may virtualization context information to improve virtualization efficiency.

At 1011, VTS 1030 sends a "VTS Registration" message to VTM 1040 to register itself and its physical resources. Alternatively, VTS 1030 may send a "VTS Update" message to VTM 1040 if it has already registered with VTM 1040. This VTS Registration message or VTS update message may include any of several parameters. Among these are information representing the physical location of VTS 1030, resource types and resource attributes of each type that VTS 1030 manages and/or can provide, a lifetime of each type of resource, a physical location of each type of resource, a volume of each type of resource, a granularity of each type of resource with which VTS 1030 can create virtual resource, a response time for creating each type of resource, a maximum number of virtual resources that each type of resource can support, and pricing information (e.g. charging plan and rate) for the resources VTS 1030 may provide. At 1012 a response may be sent back to VTS 1030 indicating the success or failure of the registration.

At 1013, VTC 1010 may send a first virtualization request to VTB 1020. This message may contain context information about VTC 1010, such as its location, its moving speed, its capabilities, and the like. This message may contain one or more resource request items ("RRIs"). Each RRI may contain following context information such as a type of the requested resource, a volume of the requested resource, an affordable price for the requested resource, an expected location of the requested resource, an expected response time of the requested resource, an expected lifetime of the requested resource, and a tolerable delay with which the resource request item may be processed by VTB 1020.

At 1014, VTB 1020 may perform a context-aware virtualization request processing. VTB 1020 may analyze and process the incoming request message received at 1013 in a context-aware approach. For example, VTB 1020 may reject request 1013 based on context information about VTC 1010 such as the location of VTC 1010 or the affordable price. In another example, VTB 1020 may buffer or immediately process request 1013 based on the contained "tolerable delay" information for each RRI. If VTB 1020 decides to reject or buffer request 1013 for a while, the remaining messages and actions described in regard to FIG. 10 may not be performed.

At 1015, VTB 1020 sends a VTS lookup message to VTM 1040. This message may be used to discover a list of VTS candidates that may potentially provide the resources requested in message 1013. The VTS lookup message may contain context information, such as any or all of the context information contained in message 1013, whether message 1013 contained multiple RRIs, and context information about VTB 1020, such as its identity and location. If message 1013 contains multiple RRIs, VTB 1020 may buffer some RRI and accordingly only contain context information about other non-buffered RRI. Alternatively, VTB 1020 may have previously registered itself to VTM 1040 and VTM 1040 may maintains VTB 1020's context information. In that case, there is no need to piggyback VTB 1020's context information in a VTS lookup message until its context information has changed. At 1016, VTM 1040 returns a list of VTS candidates to VTB 1020. The context information about each VTS as listed in registration message 1011 may be piggybacked in this message.

At 1017, VTB 1020 may perform a context-aware virtualization strategy and VTS selection. In this operation, VTB 1020 may determine a virtualization strategy (e.g., split-and-merge) and select appropriate VTSs based on context information contained in request 1013 and in response 1016 returned from VTM 1040. For example, VTB 1020 may split request 1013 into multiple virtualization request messages.

At 1018, VTB 1020 sends a second virtualization request to the selected VTS 1030. This message requests that VTS 1030 create certain required virtual resources. VTB 1020 may translate request 1013 into request 1018 in a different format that VTS 1030 can understand. Additionally, request 1018 may contain fewer RRIs than contained in request 1013. As with request 1013, request 1018 may contain context information as well.

At 1019, VTS 1030 determines whether to accept or reject request 1018 based on context information contained in the request and sends a response to VTB 1020. If VTS 1030 decides to accept request 1018, it will create the requested virtual resource by allocating the corresponding physical resource(s) and establishing the mapping relationship between the created virtual resource and original physical resource. If VTS 1030 does not have enough physical resources to meet request 1018's requirements, VTS 1030 may borrow resources from another VTS through direct interactions with that VTS.

At 1021, VTB 1020 translates response 1019 into response 1021 and forwards it to VTC 1010. If VTS 1030 rejects request 1018, VTB 1020 may re-select other VTS and re-send the request to the newly selected VTS. If VTS 1030 rejects request 1018, VTS 1030 may recommend another VTS to VTB 1020, or it may directly contact another VTS on behalf of VTB 1020.

At 1021, VTS 1030 sends a context update message to VTM 1040 to update its context information such as remaining physical resources, changes to a charging rate, and any other changes. VTS 1030 may also generate a charging record for the created virtual resource and report the charging record to VTM 1040. At 1023, VTB 1020 sends a context update message to VTM 1040 to update its remaining physical resources, changes to a charging rate, and any other changes.

In collaborative virtualization embodiments, a VTC may create certain virtual resources via a first VTB, but the requested virtual resources may not be able to be provided by a single VTS, and so must be provided by multiple VTSs. The exemplary virtualization split-and-merge process to address such a situation is illustrated in the signal flow of FIG. 11. Where there are multiple VTCs requesting virtual resources via the same VTB and the requested virtual resources can be potentially created at a single VTS, the requests may be merged. The exemplary virtualization merge-and-split process as shown in FIG. 12 may be used to address this situation.

Figure 11:
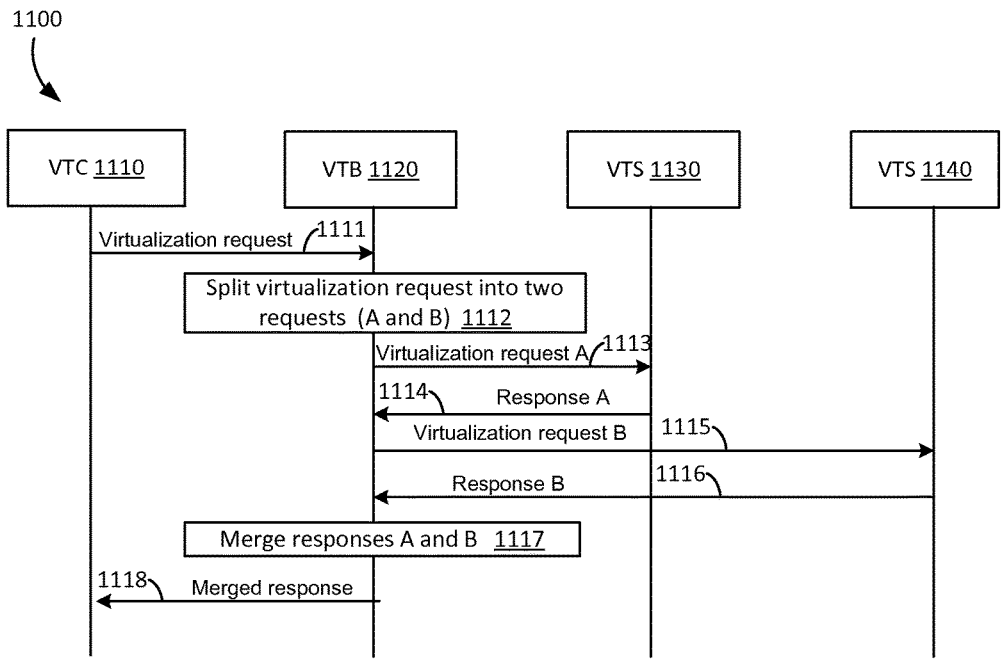
FIG. 11 illustrates another exemplary signal flow that may be used for which IoT virtualization services according to an embodiment.

FIG. 11 illustrates exemplary signal flow 1100 that may be used in embodiments employing the disclosed virtualization split-and-merge process. At 1111, VTC 1110 sends a virtualization request to VTB 1120. At 1112, VTB 1120 analyzes request 1111 and finds that a single VTS cannot satisfy the request. Note that VTB 1120 may be in contact with a VTM during this process. Further at 1112, VTB 1120 splits request 1111 into multiple requests (i.e., virtualization request A and virtualization request B) and selects two appropriate VTSs, VTS 1130 and VTS 1140. Note that VTB 1120 may split request 1111 into more than two requests and select more than two VTSs. In an embodiment, VTB 1120 may have used a VTS lookup procedure asset forth herein in conjunction with a VTM to get a list of VTS candidates.

At 1113, VTB 1120 sends virtualization request A to VTS 1130 and receives a response from VTS 1130 at 1114. At 1115, VTB 1120 sends virtualization request B to VTS 1140 and receives a response from VTS 1140 at 1116. At 1117, VTB 1120 merges response A and B to generate an aggregated response and at 1118 sends the aggregated response to VTC 1110.

Figure 12:
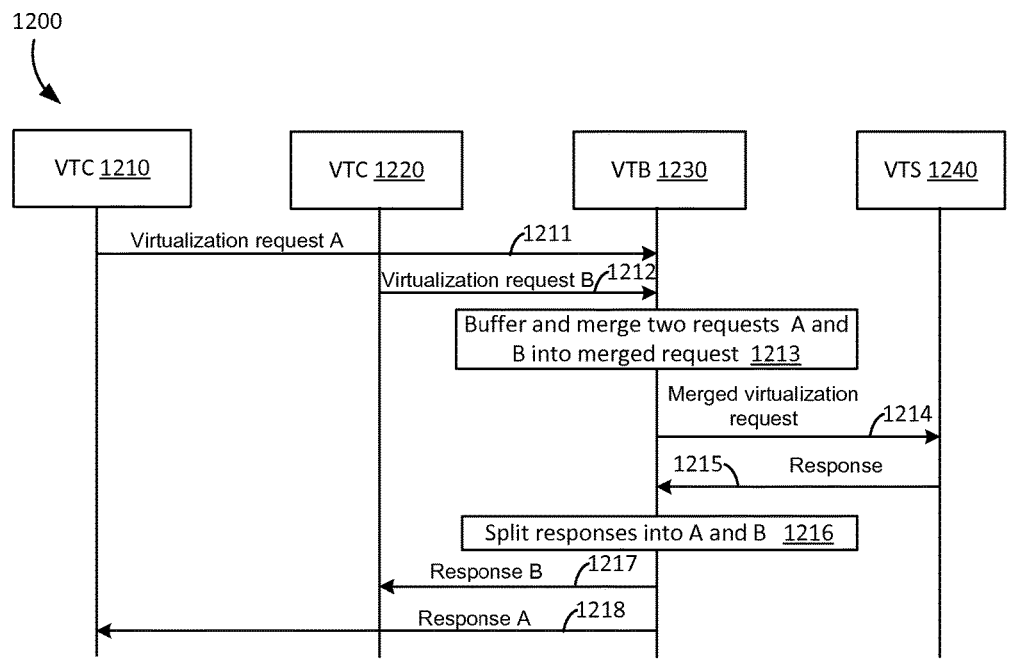
FIG. 12 illustrates another exemplary signal flow that may be used for which IoT virtualization services according to an embodiment.

FIG. 12 illustrates exemplary signal flow 1200 that may be used in embodiments employing the disclosed virtualization merge-and-split process. At 1211, VTC 1210 sends virtualization request A to VTB 1230, and at 1212, VTC 1220 sends virtualization request B to VTB 1230. At 1213, VTB 1230 buffers and merges virtualization request A and virtualization request B into a single merged request. At 1214, the merged request is sent to VTS 1240. VTB 1230 may have sent a VTS lookup to a VTM to get a list of VTS candidates. At 1215, VTS 1240 sends a response back to VTB 1230. At 1216, VTB 1230 splits the response into response A and response B, corresponding respectively to virtualization request A and virtualization request B. Response A is then sent to VTC 1210 at 1218 and response B is sent to VTC 1220 at 1217.

In an embodiment, a process for virtual resource migration within one VTM may be implemented. A VTB or VTC may need to move virtual resources from a first VTS to another VTS. There may be a single VTM that manages all these elements. After the VTB or VTC has previously created a virtual resource through the first VTS, migration may be needed due to any of a variety of factors, including load-balancing, mobility, reducing energy-consumption, policy-based virtualization adaption and/or adjustment, context-based virtualization adaptation and/or adjustment. Thus the VTB or VTC may select another VTS and may migrate existing virtual resource from the first VTS to the newly selected VTS.

Figure 13:
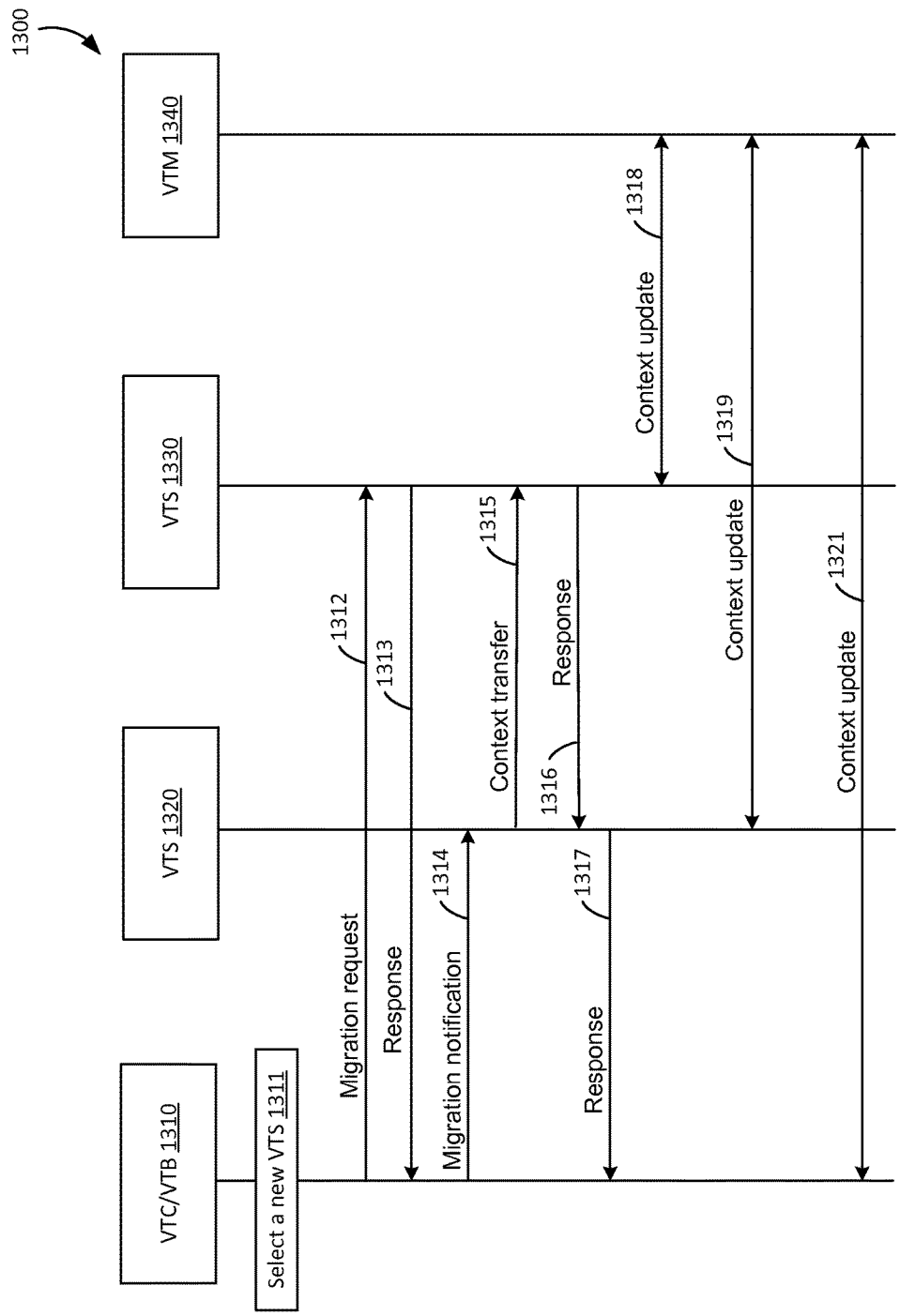
FIG. 13 illustrates another exemplary signal flow that may be used for which IoT virtualization services according to an embodiment.

FIG. 13 illustrates exemplary signal flow 1300 that may be used in embodiments employing the disclosed procedure for virtual resource migration within one VTM. At 1311, due to detecting a need to migrate resources, VTC/VTB 1310 may select a new VTS, VTS 1330 in this example. To do this, VTC/VTB 1310 may have sent a VTS lookup message to a VTM such as VTTM 1340, to get a list of VTS candidates, as described herein. Note that resource migration may be triggered by the VTS currently hosting the virtual resource (e.g., VTS 1320), the VTB (e.g., VTC/VTB 1310), or a VTM (e.g., VTM 1340) due to changes in virtualization context information and/or virtualization polices.

At 1312, VTC/VTB 1310 may send a migration request to the newly selected VTS 1330. This message may contain context information about the requested resource and context information about VTS 1310. At 1313, VTS 1330 sends a response back to VTC/VTB 1310. If VTS 1330 has rejected the migration request, VTC/VTB 1310 may select another VTS and try again. If VTS 1330 accepts the request, VTS 1330 will be prepared to receive a context transfer from the prior VTS 1320.

At 1314, VTC/VTB 1310 may send a migration notification" to VTS 1320. This message may contain context information about new VTS 1330 that may be used for preparing for the migration. A 1315, VTS 1320 sends a context transfer message to the new VTS 1330. This message may contain some or all of the context information associated with the virtual resource to be migrated. For example, if the virtual resource is storage, the stored content may be indicated so that it may be transferred from the VTS 1320 to new VTS 1330. At 1316, VTS 1330 sends a response to VTS 1320 indicating whether the context transfer was successful. If the transfer was successful, upon receipt of response 1316, VTS 1320 may cancel or otherwise delete or remove the virtual resource and relevant context information.

At 1317, VTS 1320 sends a response to VTC/VTB 1310, responding to migration notification 1314. At 1318, VTS 1330 performs a context update" with VTM 1340 to, for example, update the resource changes at VTS 1330 due to the migration. At 1319, VTS 1320 also performs a context update with VTM 1340, for example, to update resource changes at VTS 1320 due to the migration. Finally, at 1321, VTC/VTB 1310 performs a context update with VTM 1340, for example, to update VTC/VTB 1310's relationship with VTSs.

In an embodiment, a process for virtual resource migration across different VTMs may be implemented. A VTB or a VTC may need to move previously created resources at a first VTS to another VTS. A first VTM may manage the VTB or VTC, while a second VTM may manage a second VTB and VTS. According to an embodiment, a virtual resource may be moved from one VTM domain to another VTM domain.

Figure 14:
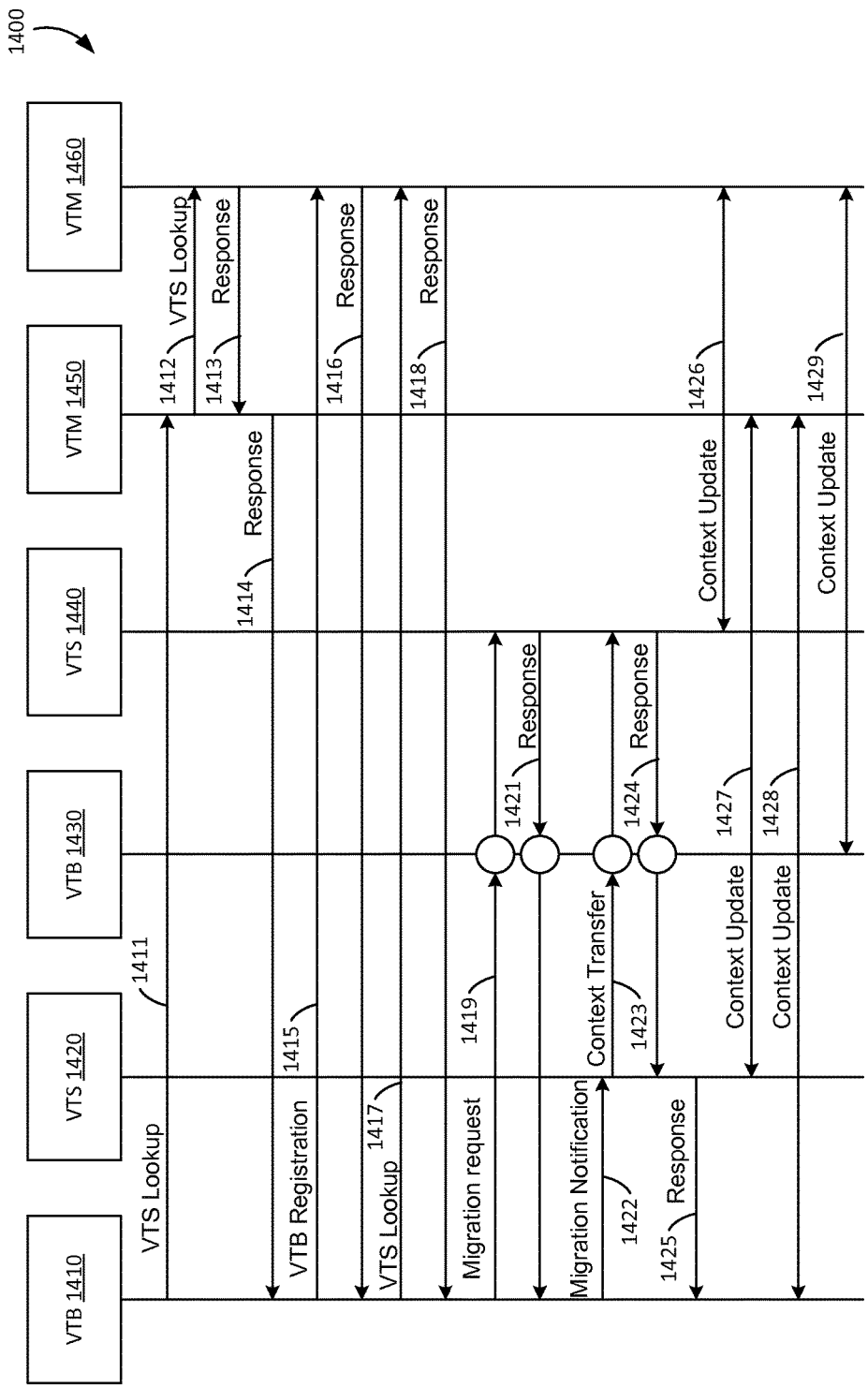
FIG. 14 illustrates another exemplary signal flow that may be used for which IoT virtualization services according to an embodiment.

FIG. 14 illustrates exemplary signal flow 1400 that may be used in embodiments employing the disclosed procedures for virtual resource migration from one VTM domain to another. At 1411, VTB 1410 sends a VTS lookup message to VTM 1450 to find an appropriate VTB in VTM 1460's domain. At 1412, VTM 1450 forwards the VTS lookup to VTM 1460 to find an appropriate VTB in VTM 1460's domain. At 1413, VTM 1460 sends a response to VTM 1450 that may include information about the determined VTB(s), such as addresses. At 1414, VTM 1450 sends that response to VTB 1410.

At 1415, VTB 1410 sends a VTB registration message to VTM 1460 with, in some embodiments, information about VTS 1450 contained in the message. At 1416, VTM 1460 sends a response back to VTB 1410. If VTB 1410 is not determine information about a VTB and VTS in VTM 1460's domain from earlier exchanges, at 1417 it may send a VTS lookup message to VTM 1460 and receive a response at 1418 with the VTB and VTS information.

At 1419, VTB 1410 sends a migration request to VTS 1440. This message may be relayed via VTB 1430 if VTM 1460 selects a VTB in previous steps. Information about VTS 1420 may be contained in this message. At 1421, VTS 1440 may send a response to VTB 1410, which may also be relayed via VTB 1430. At 1422, a migration notification may be sent to VTS 1420 containing information about VTB 1430 and VTS 1440. In response, VTS 1420 may send a context transfer message 1423 to VTS 1440, via VTB 1430 where that entity is known. At 1424, a response may be sent by VTS 1440, via VTB 1430 where that entity is known. At 1425, the response is relayed to VTB 1410 by VTS 1420.

At 1426, VTS 1440 sends a context update to VTM 1460 to inform VTM 1460 of the migrated virtual resource and other virtualization context information. At 1427, VTS 1420 sends a context update to VTM 1450 to inform VTM 1450 of the migrated virtual resource and other virtualization context information. At 1428, VTB 1410 sends a context update to VTM 1450 to inform VTM 1450 of the migrated virtual resource and other virtualization context information. And finally, at 1429, VTB 1430 sends a context update to VTM 1460 to inform VTM 1460 of the migrated virtual resource and other virtualization context information.

In cloud-based virtualization embodiments, a VTC may request to create virtual resources at a certain VTS via a first VTB. However, the first VTB may have limited capability to run computation-intensive virtualization algorithms and may not be able to determine the appropriate VTS itself. In such an embodiment, the first VTB may offload virtualization computation to a VTM.

Figure 15:
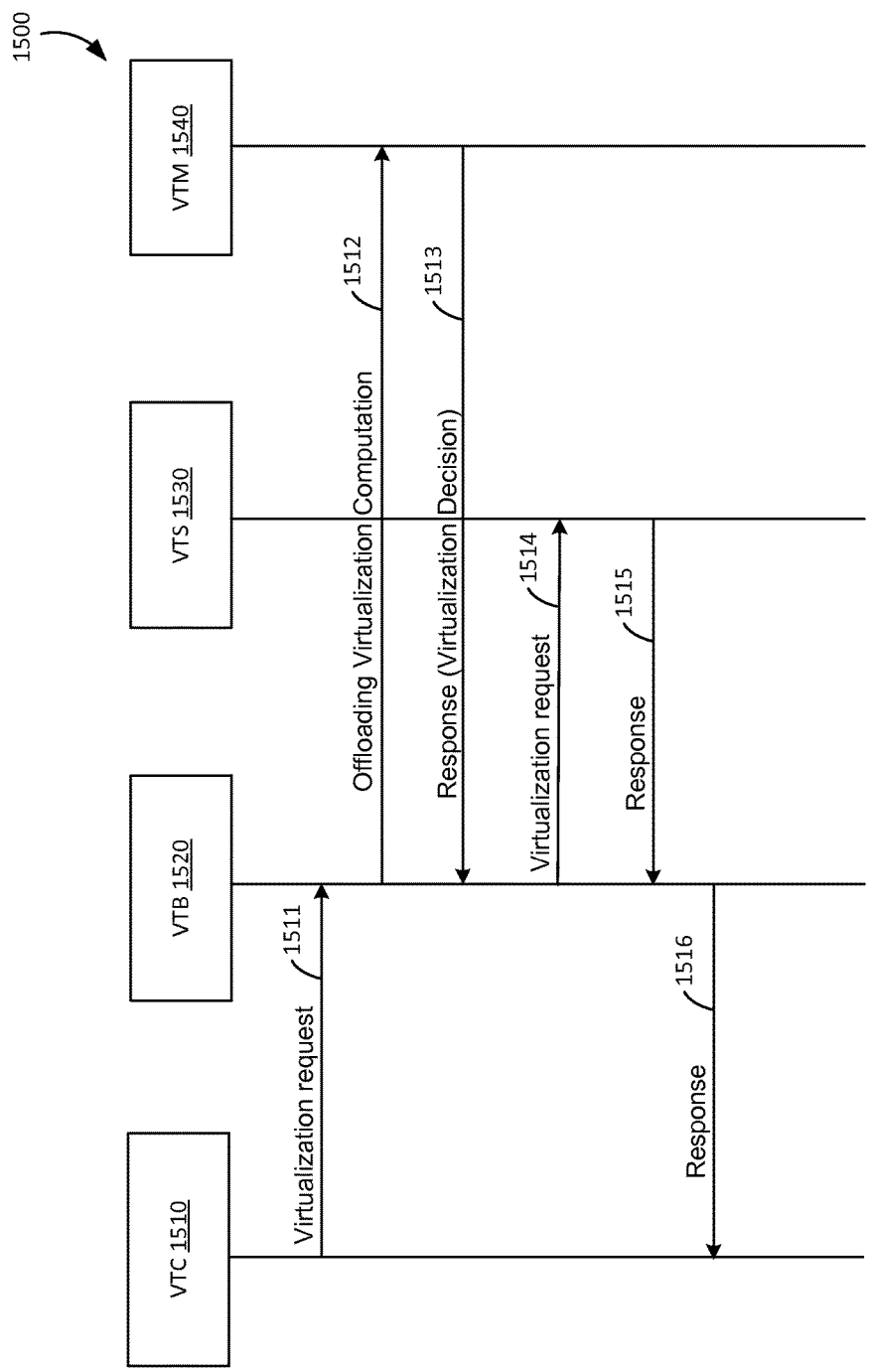
FIG. 15 illustrates another exemplary signal flow that may be used for which IoT virtualization services according to an embodiment.

FIG. 15 illustrates exemplary signal flow 1500 that may be used in embodiments employing the disclosed procedures for offloading virtualization computation. At 1511, VTC 1510 may send a virtualization request to VTB 1520. However, VTB 1520 may not be able to run the necessary virtualization algorithms to decide the proper VTSs due to the virtualization algorithms generally introducing high computation overhead, VTB 1520 may only have limited information about some VTSs, which may make it difficult to obtain a globally optimal solution, or certain preconfigured policies may prevent VTB 1520 from running a virtualization algorithm for certain types of virtual resources. Instead, VTB 1520 may offload virtualization computation tasks to VTM 1540, which may be deployed in a cloud with more powerful computation capability and more complete information about VTSs. Thus, VTB 1520 may send an offloading virtualization computation message to VTM 1540 at 1512. This message may contain the some or all of the context information contained in request 1511. Some RRIs contained in request 1511 may be buffered at VTB 1520. Rather than sent to VTM 1540. In some embodiments, VTC 1510 may directly send a virtualization request to VTM 1540 if it learns that VTB 1520 cannot perform the computation-intensive virtualization algorithms, for example from previous notifications from the VTB 1520 or VTM 1540.

VTM 1540 conducts the virtualization computation and determines the appropriate VTSs for VTB 1520. At 1513, it returns the list of selected VTSs to VTB 1520. At 1514, VTB 1520 sends a virtualization request to VTS 1530, the selected VTS chosen from the list provided by VTM 1540. VTS 1530 determines whether or not to accept the request and returns a response at 1515. If VTS 1530 decides to accept the request, it will create the requested virtual resources by allocating the corresponding physical resources and establishing the mapping relationship between the created virtual resource and original physical resource. If VTS 1530 rejects the request VTB 1520 may obtain other VTS by repeating the steps 1512 and 1513 and sending the request to another VTS. At 1516, VTB 1520 forward the response from VTS 1530 to VTC 1510, performing any necessary translation in the process.

Figure 16:
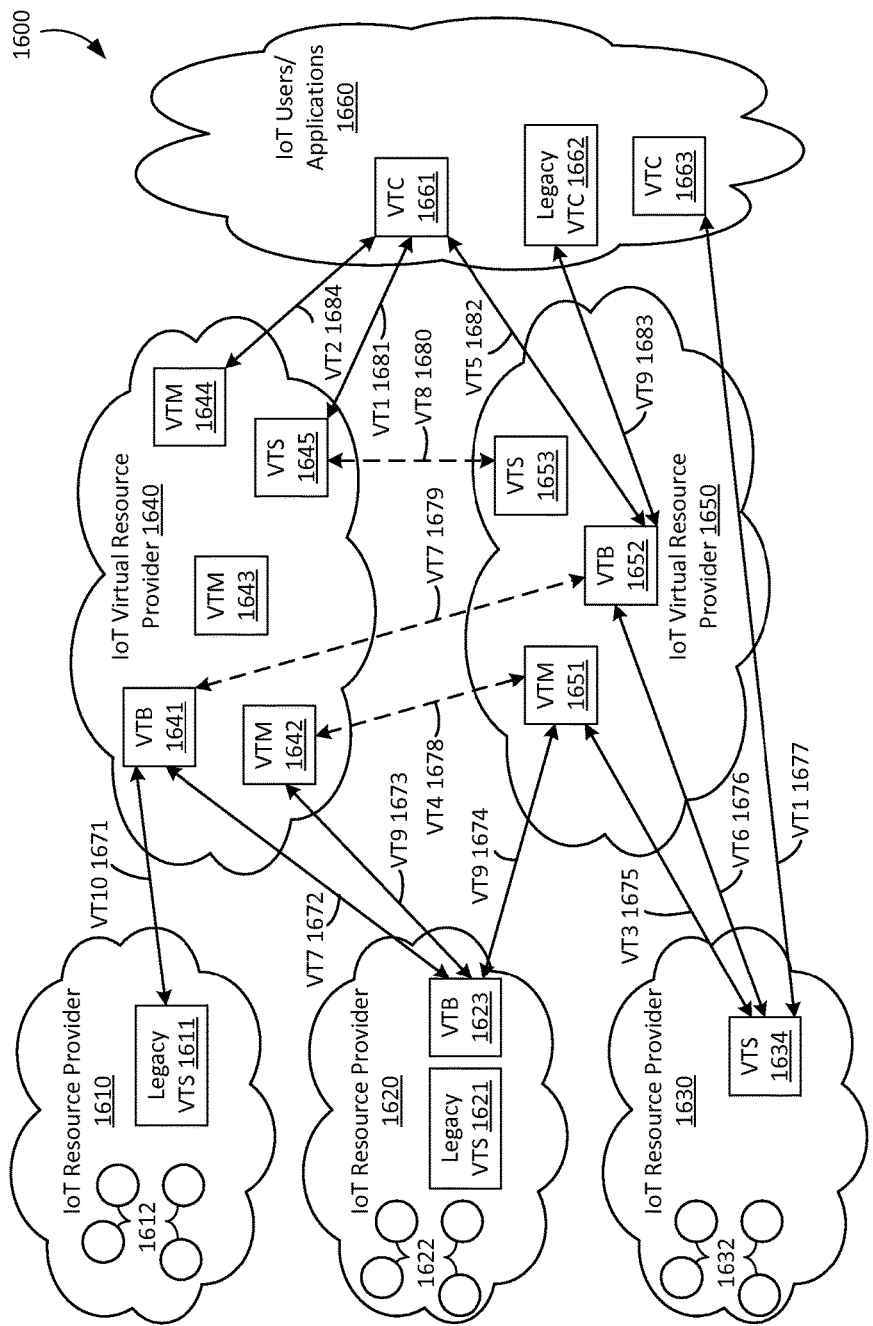
FIG. 16 illustrates another exemplary network configuration in which IoT virtualization services may be implemented according to an embodiment.

FIG. 16 illustrates an exemplary embodiment of a virtual resource provider (VRP). In system 1600 of FIG. 16, virtualization services may be leveraged to manage IoT resource virtualization and to facilitate IoT VRPs. System 1600 includes IoT Resource Providers ("RESPs") 1610, 1620, and 1630, each with physical resources 1612, 1622, and 1632, respectively. System 1600 also includes IoT VRPs 1640 and 1650 that do not have physical resources, but host virtualization services and may provide virtual resources to users and/or applications. VRPs 1640 and 1650 may request resources from IoT RESPs 1610, 1620, and 1630, or from each other or other IoT VRPs and RESPs statically or dynamically based on the demands of users or applications. An example of a RESP may be a network provider that deploys many access points along highways for connecting and relaying data traffic from moving cars to the cloud. An example of a VRP may be a car manufacturer or intelligent transportation service provider. These entities do not need to own physical access points but instead rent virtual access points from a network provider to provide intelligent transportation services, such as real-time traffic notification and car condition monitoring to car drivers. In such embodiments, the car manufacturer or intelligent transportation service provider is a virtual resource provider, the network provider is a physical resource provider, the car drivers are users, and the access point manufacturer is a physical resource manufacturer. Each of these may support the exemplary virtualization functionalities, interfaces, and procedures disclosed herein.

As illustrated in FIG. 16, IoT VRP 1640 may request virtual resources from IoT VRP 1650 and vice versa. IoT VRP 1640 may also request resources from IoT RESPs, such as RESPs 1610, 1620, and 1630. An example of an IoT RESP may be a company that deploys a large-scale sensor network infrastructure in a neighborhood to monitor environments. The sensor network infrastructure may be rented to users, including an IoT VRP. Another IoT RESP example may be a company that deploys numerous access points or gateways along a highway. These gateways and access points may be rented by VRPs and users.

Users and applications may request resources from IoT RESPs or IoT VRPs that may be provided transparently to the users and applications perspective. IoT users and applications may not know and/or may not need to know if the requested resources are granted from an IoT VRP or an IoT RESP.

Where an IoT RESP only has legacy VTS, such as IoT RESP 1610 and legacy VTS 1611, such a RESP may connect to a VTB in an IoT VRP via a VT10 interface, such as legacy VTS 1611 is connecting to VTB 1641 in IoT VRP 1640 using VT10 1671. Where an IoT RESP hosts a VTB, such as IoT RESP 1620 that hosts VTB 1623 and legacy VTS 1621, the RESP may connect to VTBs and VTMs in an IoT VRP via VT7 and VT9 interfaces, respectively. For example, VTB 1623 is connected to VTB 1641 via VT7 1672 and to VTM 1642 and VTM 1651 via VT9 1673 and VT9 1674, respectively. Where an IoT RESP hosts a VTS, such as IoT RESP 1630 hosting VTS 1634, the IoT RESP may connect to a VTB and VTM in an IoT VRP via VT6 and VT3 interfaces, respectively. For example, VTS 1634 is connected to VTM 1651 via VT3 1675 and to VTB 1652 via VT6 1676. As can be seen from the figure, other entities throughout system 1600 are connected using the interfaces and means set forth herein.

Figure 17:
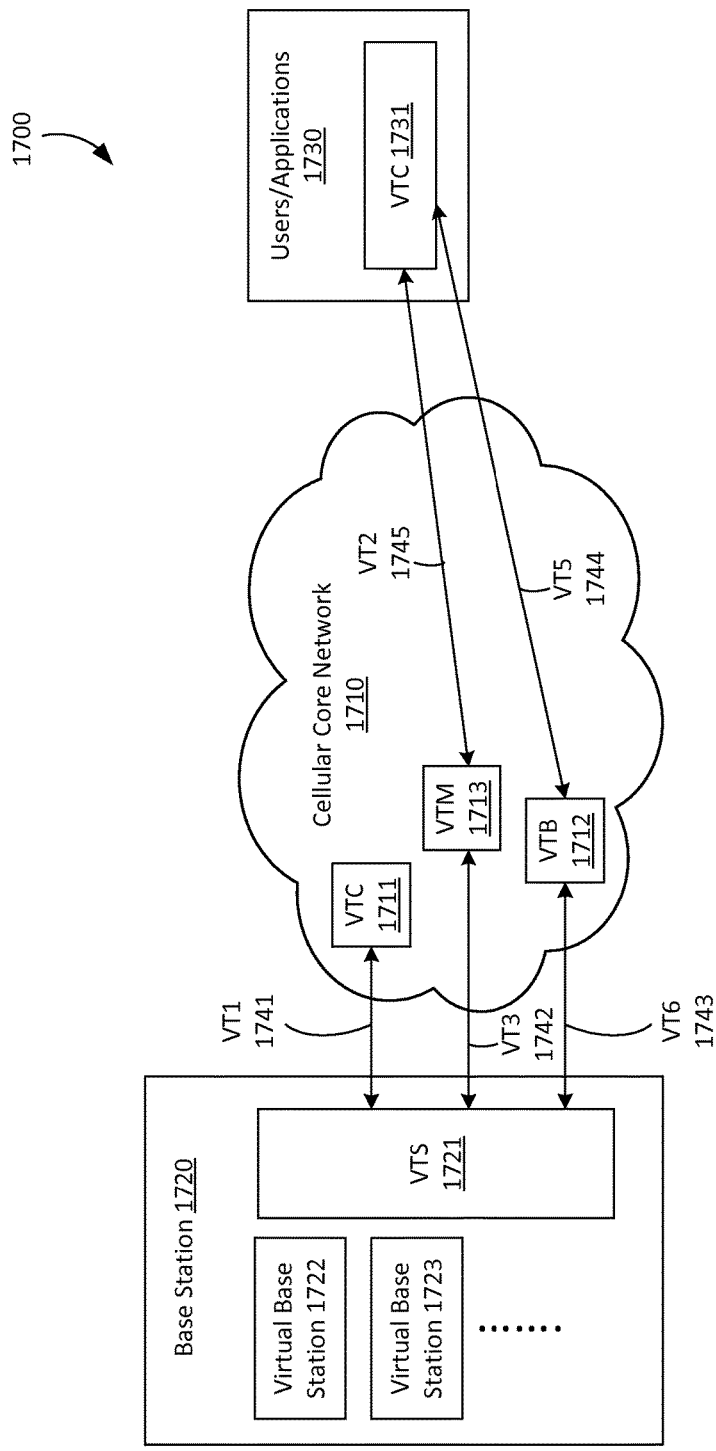
FIG. 17 illustrates another exemplary network configuration in which IoT virtualization services may be implemented according to an embodiment.

FIG. 17 illustrates an example of base station virtualization management. System 1700 may include cellular core network 1710, base station 1720, and users and applications 1730. Virtualization functions VTM 1713, VTC 1711, and VTB 1712 may reside in cellular core network 1710 as standalone core network entities or they may be integrated into existing entities such as MTC-IWF, HSS, or MME. VTS 1721 may reside in base station 1720. VTC 1711 in cellular core network 1710 may trigger the creation and management of virtual base stations 1722, 1723, etc. at the base station 1720 over interface VT1 1741. Third-party users and applications VTC 1731 may also trigger the creation and management of virtual base stations 1722, 1723, etc. at the base station 1720, but via VTB 1712 residing in cellular core network 1710 via interface VT5 1744, thus leaving virtual base station management is under the control of cellular core network 1710.

Figure 18A:
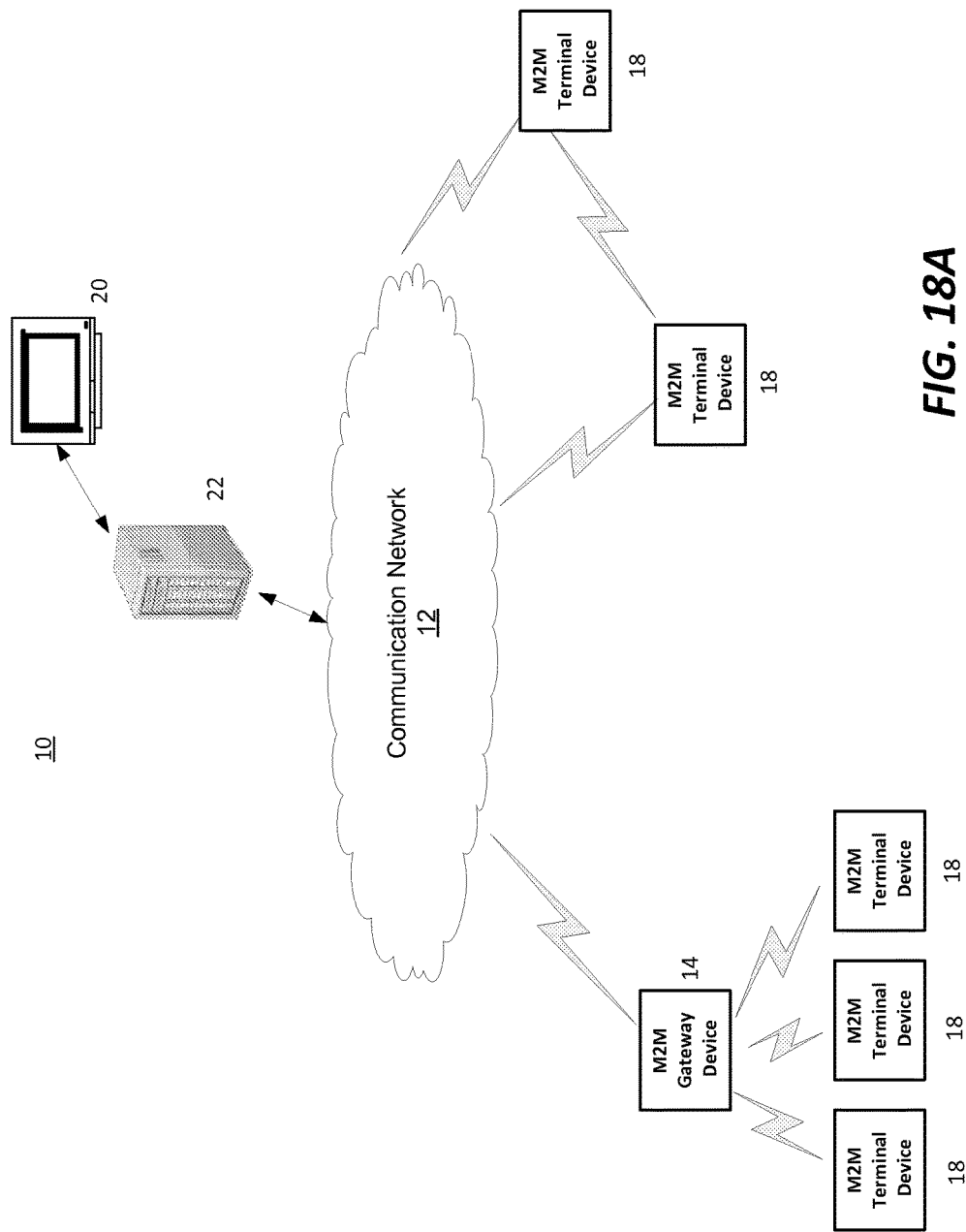
FIG. 18A is a system diagram of an example machine-to-machine (M2M) or Internet of Things (IoT) communication system in which one or more disclosed embodiments may be implemented.

FIG. 18A is a diagram of an example M2M or IoT communication system 10 in which one or more disclosed embodiments of systems and methods for IoT virtualization services may be implemented. Generally, M2M technologies provide building blocks for the IoT, and any M2M device, gateway, or service platform may be a component of the IoT as well as an IoT service layer, etc.

As shown in FIG. 18A, the M2M/IoT communication system 10 includes a communication network 12. The communication network 12 may be a fixed network or a wireless network (e.g., WLAN, cellular, or the like) or a network of heterogeneous networks. For example, the communication network 12 may comprise of multiple access networks that provide content such as voice, data, video, messaging, broadcast, or the like to multiple users. For example, the communication network 12 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like. Further, the communication network 12 may comprise other networks such as a core network, the Internet, a sensor network, an industrial control network, a personal area network, a fused personal network, a satellite network, a home network, or an enterprise network for example.

As shown in FIG. 18A, the M2M/IoT communication system 10 may include an M2M gateway device 14, and M2M terminal devices 18. It will be appreciated that any number of M2M gateway devices 14 and M2M terminal devices 18 may be included in the M2M/IoT communication system 10 as desired. Each of the M2M gateway devices 14 and M2M terminal devices 18 may be configured to transmit and receive signals via the communication network 12 or direct radio link. The M2M gateway device 14 allows wireless M2M devices (e.g., cellular and non-cellular) as well as fixed network M2M devices (e.g., PLC) to communicate either through operator networks, such as the communication network 12, or through direct radio link. For example, the M2M devices 18 may collect data and send the data, via the communication network 12 or direct radio link, to an M2M application 20 or M2M devices 18. The M2M devices 18 may also receive data from the M2M application 20 or an M2M device 18. Further, data and signals may be sent to and received from the M2M application 20 via an M2M service platform 22, as described below. M2M devices 18 and gateways 14 may communicate via various networks including, cellular, WLAN, WPAN (e.g., Zigbee, 6LoWPAN, Bluetooth), direct radio link, and wireline for example. Any of the entities described herein, including the disclosed virtualization managers (VTMs), virtualization servers (VTSs), virtualization clients (VTCs), and virtualization brokers (VTBs), may be implemented, in whole or in part, at devices or entities such as M2M devices 18, gateways 14, and service platform 22. All such embodiments are contemplated as within the scope of the present disclosure.

The illustrated M2M service platform 22 provides services for the M2M application 20, M2M gateway devices 14, M2M terminal devices 18, and the communication network 12. It will be understood that the M2M service platform 22 may communicate with any number of M2M applications, M2M gateway devices 14, M2M terminal devices 18, and communication networks 12 as desired. The M2M service platform 22 may be implemented by one or more servers, computers, or the like. The M2M service platform 22 provides services such as management and monitoring of M2M terminal devices 18 and M2M gateway devices 14. The M2M service platform 22 may also collect data and convert the data such that it is compatible with different types of M2M applications 20. The functions of the M2M service platform 22 may be implemented in a variety of ways, for example as a web server, in the cellular core network, in the cloud, etc.

Figure 18B:
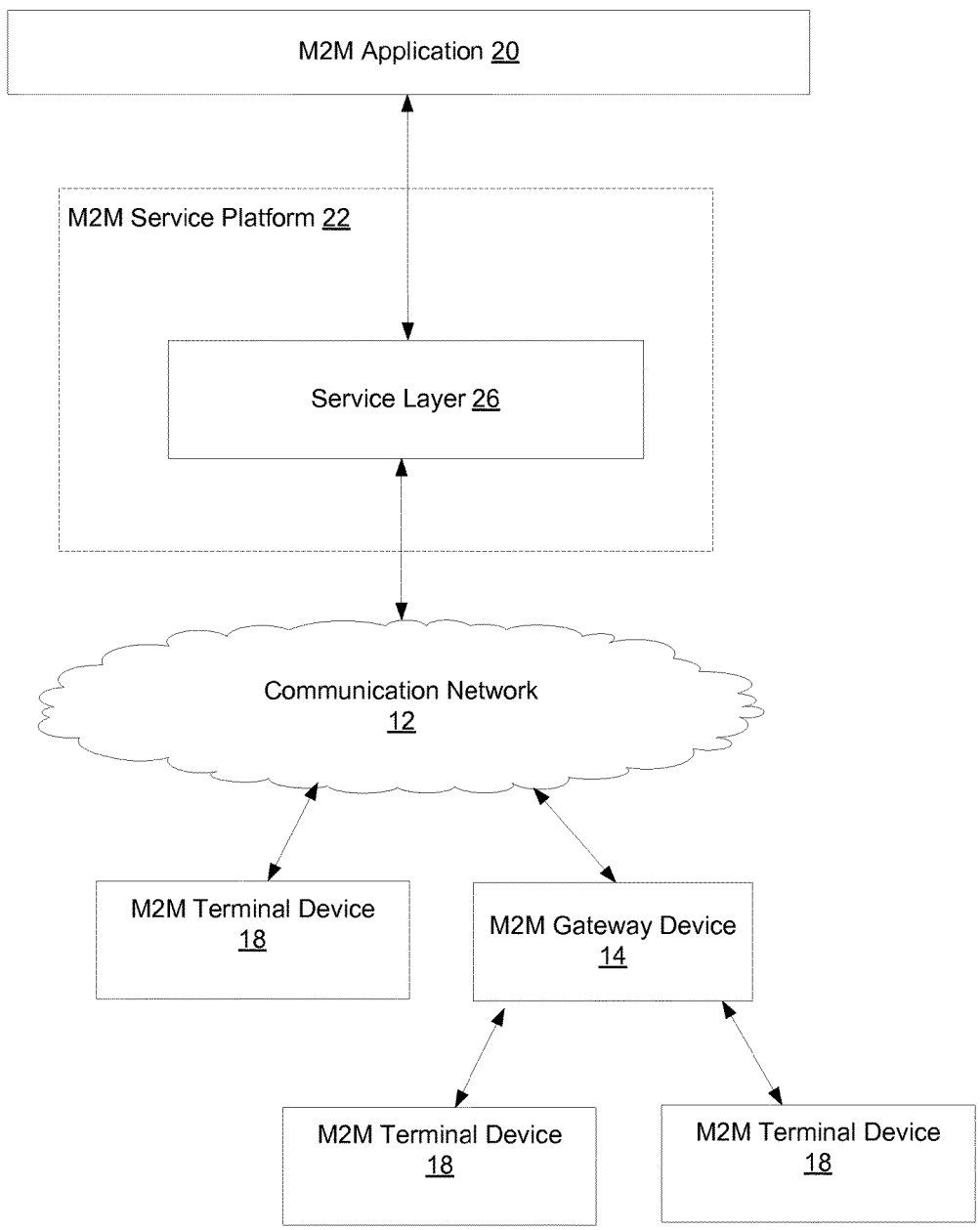
FIG. 18B is a system diagram of an example architecture that may be used within the M2M/IoT communications system illustrated in FIG. 18A.

Referring also to FIG. 18B, the M2M service platform typically implements a service layer 26 (e.g. a network service capability layer (NSCL) as described herein) that provides a core set of service delivery capabilities that diverse applications and verticals can leverage. These service capabilities enable M2M applications 20 to interact with devices and perform functions such as data collection, data analysis, device management, security, billing, service/ device discovery, etc. Essentially, these service capabilities free the applications of the burden of implementing these functionalities, thus simplifying application development and reducing cost and time to market. The service layer 26 also enables M2M applications 20 to communicate through various networks 12 in connection with the services that the service layer 26 provides.

In some embodiments, M2M applications 20 may include desired applications that form the basis for creation of one or more peer-to-peer networks that include devices that may use the disclosed of systems and methods for IoT virtualization services. M2M applications 20 may include applications in various industries such as, without limitation, transportation, health and wellness, connected home, energy management, asset tracking, and security and surveillance. As mentioned above, the M2M service layer, running across the devices, gateways, and other servers of the system, supports functions such as, for example, data collection, device management, security, billing, location tracking/geofencing, device/service discovery, and legacy systems integration, and provides these functions as services to the M2M applications 20. The applications with which the described service layer and objects interact may be applications such as those of M2M applications 20.

Figure 18C:
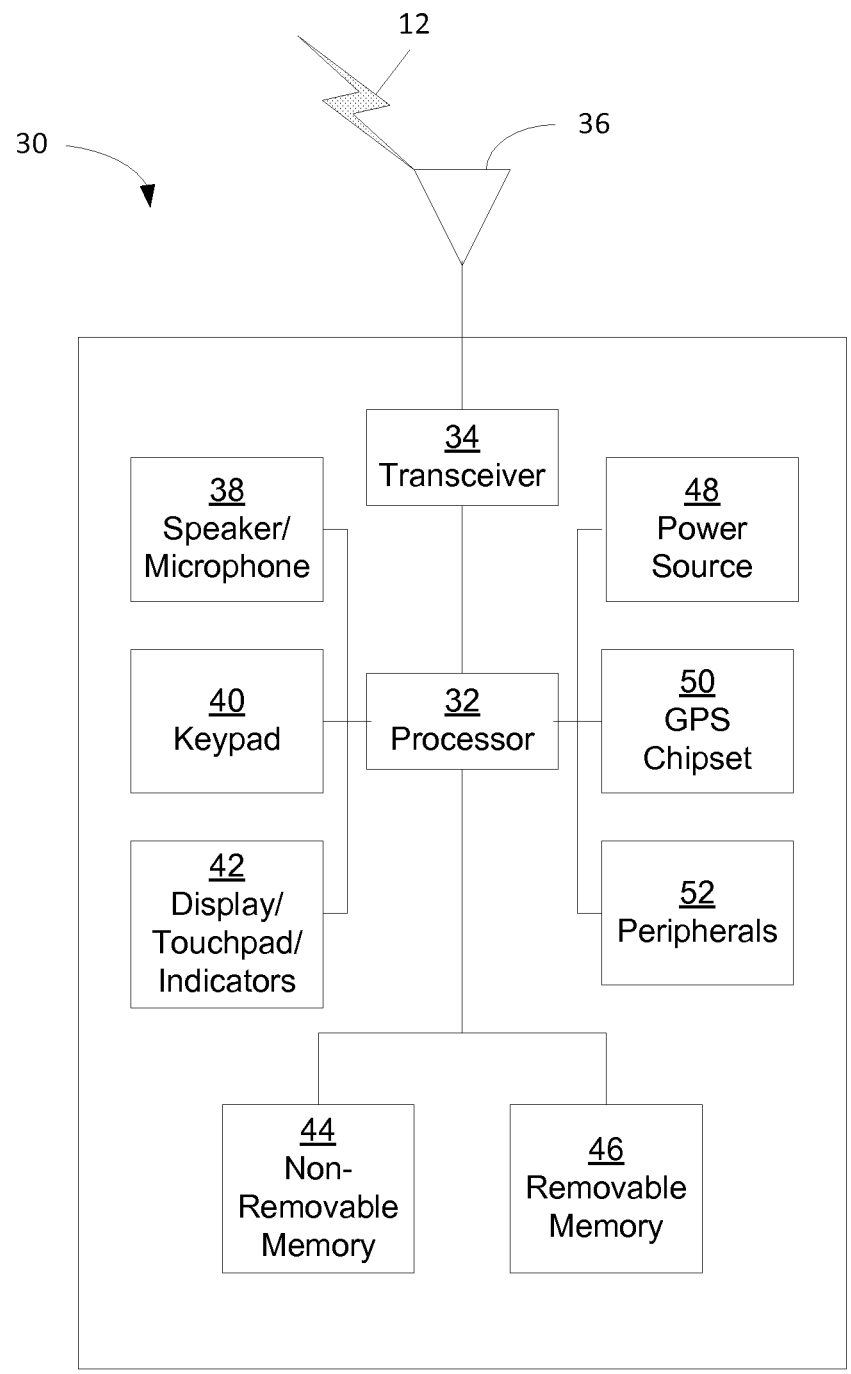
FIG. 18C is a system diagram of an example M2M/IoT terminal or gateway device that may be used within the communications system illustrated in FIG. 18A.

FIG. 18C is a system diagram of an example M2M device 30, such as an M2M terminal device 18 or an M2M gateway device 14 for example. As shown in FIG. 18C, the M2M device 30 may include a processor 32, a transceiver 34, a transmit/receive element 36, a speaker/microphone 38, a keypad 40, a display/touchpad/indicators (e.g., one or more light emitting diodes (LEDs)) 42, non-removable memory 44, removable memory 46, a power source 48, a global positioning system (GPS) chipset 50, and other peripherals 52. It will be appreciated that the M2M device 40 may include any sub-combination of the foregoing elements while remaining consistent with an embodiment. This device may be a device that uses the disclosed systems and methods for IoT virtualization services.

The processor 32 may be a general purpose processor, a special purpose processor, a conventional processor, a digital signal processor (DSP), a plurality of microprocessors, one or more microprocessors in association with a DSP core, a controller, a microcontroller, one or more Application Specific Integrated Circuits (ASICs), one or more Field Programmable Gate Array (FPGAs) circuits, any other type and number of integrated circuits (ICs), a state machine, and the like. The processor 32 may perform signal coding, data processing, power control, input/output processing, and/or any other functionality that enables the M2M device 30 to operate in a wireless environment. The processor 32 may be coupled to the transceiver 34, which may be coupled to the transmit/receive element 36. While FIG. 18C depicts the processor 32 and the transceiver 34 as separate components, it will be appreciated that the processor 32 and the transceiver 34 may be integrated together in an electronic package or chip. The processor 32 may perform application-layer programs (e.g., browsers) and/or radio access-layer (RAN) programs and/or communications. The processor 32 may perform security operations such as authentication, security key agreement, and/or cryptographic operations, such as at the access layer and/or application layer for example.

The transmit/receive element 36 may be configured to transmit signals to, and/or receive signals from, an M2M service platform 9. For example, in an embodiment, the transmit/receive element 36 may be an antenna configured to transmit and/or receive RF signals. The transmit/receive element 36 may support various networks and air interfaces, such as WLAN, WPAN, cellular, and the like. In an embodiment, the transmit/receive element 36 may be an emitter/detector configured to transmit and/or receive IR, UV, or visible light signals, for example. In yet another embodiment, the transmit/receive element 36 may be configured to transmit and receive both RF and light signals. It will be appreciated that the transmit/receive element 36 may be configured to transmit and/or receive any combination of wireless or wired signals.

In addition, although the transmit/receive element 36 is depicted in FIG. 18C as a single element, the M2M device 30 may include any number of transmit/receive elements 36. More specifically, the M2M device 30 may employ MIMO technology. Thus, in an embodiment, the M2M device 30 may include two or more transmit/receive elements 36 (e.g., multiple antennas) for transmitting and receiving wireless signals.

The transceiver 34 may be configured to modulate the signals that are to be transmitted by the transmit/receive element 36 and to demodulate the signals that are received by the transmit/receive element 36. As noted above, the M2M device 30 may have multi-mode capabilities. Thus, the transceiver 34 may include multiple transceivers for enabling the M2M device 30 to communicate via multiple RATs, such as UTRA and IEEE 802.11, for example.

The processor 32 may access information from, and store data in, any type of suitable memory, such as the non-removable memory 44 and/or the removable memory 46. The non-removable memory 44 may include random-access memory (RAM), read-only memory (ROM), a hard disk, or any other type of memory storage device. The removable memory 46 may include a subscriber identity module (SIM) card, a memory stick, a secure digital (SD) memory card, and the like. In other embodiments, the processor 32 may access information from, and store data in, memory that is not physically located on the M2M device 30, such as on a server or a home computer. The processor 32 may be configured to control lighting patterns, images, or colors on the display or indicators 42 in response to various conditions and parameters, such as virtualization requests being generated, transmitted, and responded to, context updates being generated and/or received, and any other virtualization related conditions and parameters such as those described in some of embodiments set forth herein.

The processor 32 may receive power from the power source 48, and may be configured to distribute and/or control the power to the other components in the M2M device 30. The power source 48 may be any suitable device for powering the M2M device 30. For example, the power source 48 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 32 may also be coupled to the GPS chipset 50, which may be configured to provide location information (e.g., longitude and latitude) regarding the current location of the M2M device 30. It will be appreciated that the M2M device 30 may acquire location information by way of any suitable location-determination method while remaining consistent with an embodiment.

The processor 32 may further be coupled to other peripherals 52 that may include one or more software and/or hardware modules that provide additional features, functionality and/or wired or wireless connectivity. For example, the peripherals 52 may include an accelerometer, an e-compass, a satellite transceiver, a sensor, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 18D:
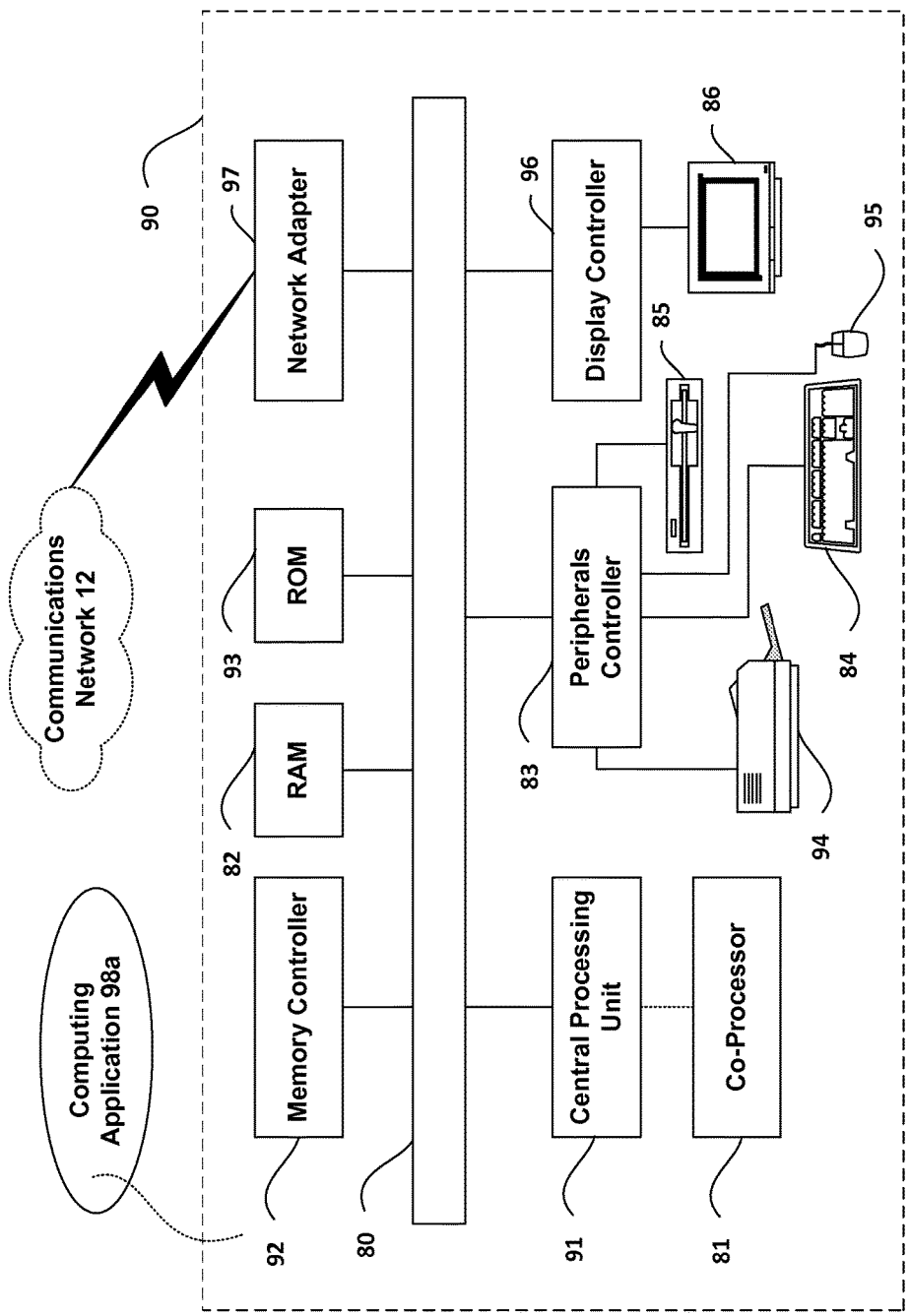
FIG. 18D is a block diagram of an example computing system in which aspects of the communication system of FIG. 18A may be embodied.

FIG. 18D is a block diagram of an exemplary computing system 90 on which, for example, the M2M service platform 22 of FIGS. 18A and 18B may be implemented. Computing system 90 may comprise a computer or server and may be controlled primarily by computer readable instructions that may be in the form of software, wherever, or by whatever means such software is stored or accessed. Such computer readable instructions may be executed within central processing unit (CPU) 91 to cause computing system 90 to do work. In many known workstations, servers, and personal computers, central processing unit 91 is implemented by a single-chip CPU called a microprocessor. In other machines, the central processing unit 91 may comprise multiple processors. Coprocessor 81 is an optional processor, distinct from main CPU 91 that performs additional functions or assists CPU 91. CPU 91 and/or coprocessor 81 may receive, generate, and process data related to the disclosed systems and methods for IoT virtualization services.

In operation, CPU 91 fetches, decodes, and executes instructions, and transfers information to and from other resources via the computer's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memory devices coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 may be read or changed by CPU 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode can access only memory mapped by its own process virtual address space; it cannot access memory within another process's virtual address space unless memory sharing between the processes has been set up.

In addition, computing system 90 may contain peripherals controller 83 responsible for communicating instructions from CPU 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain network adaptor 97 that may be used to connect computing system 90 to an external communications network, such as network 12 of FIGS. 18A and 18B. In an embodiment, network adaptor 97 may receive and transmit data related to the disclosed systems and methods for IoT virtualization services.

It is understood that any or all of the systems, methods, and processes described herein may be embodied in the form of computer executable instructions (i.e., program code) stored on a computer-readable storage medium embodied as a physical device or apparatus. Such instructions, when executed by a machine, or a processor configured in a machine, such as a computer, server, M2M terminal device, M2M gateway device, or the like, effectuate, perform, and/or implement the systems, methods and processes described herein. Specifically, any of the steps, operations or functions described above may be implemented in the form of such computer executable instructions. Computer readable storage media include both volatile and nonvolatile, removable and non-removable media implemented in any method or technology for storage of information, but such computer readable storage media do not include signals. Computer readable storage media include, but are not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other physical medium that can be used to store the desired information and that can be accessed by a computer.

In describing preferred embodiments of the subject matter of the present disclosure, as illustrated in the figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose.

This written description uses examples to disclose the invention, including the best mode, and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method implemented in a virtualization broker in a network of connected entities, the method comprising:

receiving, from a first entity, a first request to create a virtual resource, the first request to create the virtual resource comprising context information associated with the first entity;

receiving, from a second entity, a second request to create a virtual resource, the second request to create the virtual resource comprising context information associated with the second entity;

generating, based on the first request and the second request, a combined request to create a virtual resource;

transmitting a request for a virtualization server identifier from the virtualization broker to a virtualization manager, wherein the virtualization manager facilitates interactions between multiple virtualization brokers and maintains a list of available virtualization servers and a unique virtualization server identifier associated with each virtualization server;

receiving a virtualization server identifier from the virtualization manager;

transmitting the combined request to create the virtual resource to a virtualization server associated with the virtualization server identifier;

receiving a response from the virtualization server comprising an indication that a virtual resource has been created;

generating, based on the received response and the first request to create the virtual resource, a first response;

transmitting the first response from the virtualization broker to the first entity;

generating, based on the received response and the second request to create the virtual resource, a second response; and transmitting the second response from the virtualization broker to the second entity.

2. The method of claim 1, wherein the combined request to create the virtual resource comprises a subset of the context information associated with the first entity and the context information associated with the second entity.

3. The method of claim 1, wherein receiving the virtualization server identifier from the virtualization manager comprises receiving a plurality of virtualization server identifiers.

4. The method of claim 3, further comprising selecting the virtualization server identifier from among the plurality of virtualization server identifiers based on at least one of the context information associated with the first entity and the context information associated with the second entity.

5. The method of claim 1, further comprising transmitting a context update to the virtualization manager.

6. The method of claim 5, further comprising translating the received response from a first format into a second format.

7. The method of claim 1, further comprising transmitting a registration request to a virtualization manager, the registration request comprising information associated with the virtualization server.

8. A virtualization management entity in a network of connected entities, the virtualization management entity comprising:
 a processor adapted to execute computer-readable instructions; and
 a memory communicatively coupled to the processor and having stored therein computer-readable instructions that, when executed by the processor, cause the processor to effectuate operations comprising:
  receiving a request to register resources associated with a virtualization server entity;
  storing information associated with the virtualization server entity and the resources;
  receiving a request for a recommended virtualization server entity identifier from a virtualization broker entity, wherein the request for the recommended virtualization server entity identifier comprises context information;
  selecting the virtualization server entity based on the context information; and
  transmitting a virtualization server entity identifier to the virtualization broker entity;
  wherein the virtualization management entity facilitates interactions between multiple virtualization broker entities and maintains a list of available virtualization server entities and a unique virtualization server entity identifier associated with each virtualization server entity; and
  wherein the virtualization broker entity is configured to generate the request for the recommended virtualization server entity identifier based on a first request to create a virtual resource received from a first entity and a second request to create a virtual resource received from a second entity.

9. The virtualization management entity of claim 8, wherein the memory has further stored therein computer-readable instructions that, when executed by the processor, cause the processor to effectuate operations comprising:
 receiving a context update from the virtualization server entity; and
 modifying the stored information associated with the virtualization server entity and the resources based on the context update.

10. The virtualization management entity of claim 8, wherein the memory has further stored therein computer-readable instructions that, when executed by the processor, cause the processor to effectuate operations comprising:
 receiving a context update from the virtualization broker entity; and
 modifying second stored information associated with the virtualization broker entity based on the context update.

11. The virtualization management entity of claim 8, wherein the memory has further stored therein computer-readable instructions that, when executed by the processor, cause the processor to effectuate operations comprising:
 receiving a context update from the virtualization server entity indicating that a resource provided by the virtualization server entity will be provided by a second virtualization server entity and no longer provided by the virtualization server entity; and
 modifying stored information associated with the virtualization server entity and the resources based on the context update.

12. The virtualization management entity of claim 8, wherein the memory has further stored therein computer-readable instructions that, when executed by the processor, cause the processor to effectuate operations comprising:
 receiving a second request for a second recommended virtualization server entity identifier from a second virtualization management entity in a second domain, wherein the virtualization management entity is in a first domain, wherein the second request for the second recommended virtualization server entity identifier comprises second context information;
 selecting a second virtualization server entity based on the second context information; and
 transmitting a second virtualization server entity identifier to the second virtualization management entity.

13. The virtualization management entity of claim 8, wherein the memory has further stored therein computer-readable instructions that, when executed by the processor, cause the processor to effectuate operations comprising:
 receiving a request to execute a virtualization algorithm from a second virtualization broker entity;
 executing the virtualization algorithm to determine a second virtualization server entity; and
 transmitting a second virtualization server entity identifier associated with the virtualization server entity to the second virtualization broker entity.

14. The virtualization management entity of claim 13, wherein the request to execute the virtualization algorithm comprises context information.

15. A virtualization server entity in a network of connected entities comprising:
 a processor adapted to execute computer-readable instructions; and
 a memory communicatively coupled to the processor and having stored therein computer-readable instructions that, when executed by the processor, cause the processor to effectuate operations comprising:
  receiving a request to create a virtual resource from a virtualization broker entity, wherein the virtualization broker entity is configured to generate the request to create the virtual resource based on a first request to create a virtual resource received from a first entity and a second request to create a virtual resource received from a second entity;

determining to accept the request to create the virtual resource;

creating the virtual resource; and transmitting a response to the virtualization broker entity indicating that the virtual resource has been created, wherein a virtualization management entity facilitates interactions between multiple virtualization broker entities and maintains a list of available virtualization server entities and a unique virtualization server entity identifier associated with each virtualization server entity.

16. The virtualization server entity of claim 15, wherein the request comprising context information, and wherein the determining to accept the request to create the virtual resource is based on the context information.

17. The virtualization server entity of claim 15, wherein the memory has further stored therein computer-readable instructions that, when executed by first processor, cause the processor to effectuate operations comprising:

transmitting a context update to a virtualization management entity indicating that the virtual resource has been created.

18. The virtualization server entity of claim 15, wherein the memory has further stored therein computer-readable instructions that, when executed by first processor, cause the processor to effectuate operations comprising:

obtaining a virtualization policy from a virtualization management entity.

19. The virtualization server entity of claim 18, wherein the memory has further stored therein computer-readable instructions that, when executed by first processor, cause the processor to effectuate operations comprising:

receiving a request for the virtual resource from a second entity; and providing the virtual resource to the second entity according to the virtualization policy.

20. The virtualization server entity of claim 15, wherein the memory has further stored therein computer-readable instructions that, when executed by first processor, cause the processor to effectuate operations comprising:

receiving a request to update the virtual resource from the virtualization broker entity;

modifying information associated with the virtual resource based on the request to update the virtual resource; and transmitting a second response to the virtualization broker entity indicating that the virtual resource has been updated.

* * * * *